(12) United States Patent
Nakamoto et al.

(10) Patent No.: US 10,801,497 B2
(45) Date of Patent: Oct. 13, 2020

(54) ELECTRIC COMPRESSOR CONTROLLER AND REFRIGERATION CYCLE DEVICE

(71) Applicant: DENSO CORPORATION, Kariya, Aichi-pref. (JP)

(72) Inventors: Shinji Nakamoto, Kariya (JP); Koji Sakai, Kariya (JP); Akihiro Imura, Kariya (JP); Akitomo Yamanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 253 days.

(21) Appl. No.: 15/744,184

(22) PCT Filed: Jul. 28, 2016

(86) PCT No.: PCT/JP2016/072182
§ 371 (c)(1),
(2) Date: Jan. 12, 2018

(87) PCT Pub. No.: WO2017/022626
PCT Pub. Date: Feb. 9, 2017

(65) Prior Publication Data
US 2018/0202442 A1 Jul. 19, 2018

(30) Foreign Application Priority Data
Jul. 31, 2015 (JP) .................... 2015-151927

(51) Int. Cl.
*F04C 28/06* (2006.01)
*F25B 1/04* (2006.01)
(Continued)

(52) U.S. Cl.
CPC .............. *F04C 28/06* (2013.01); *F04B 35/04* (2013.01); *F04B 49/02* (2013.01); *F04B 49/20* (2013.01);
(Continued)

(58) Field of Classification Search
CPC .......... F04C 28/04; F04C 28/06; F04C 28/00; F04C 2270/72; F04C 2270/025;
(Continued)

(56) References Cited

U.S. PATENT DOCUMENTS 10,436,194 B2 * 10/2019 Nagata ................ F04C 2/025
2006/0193728 A1 * 8/2006 Lindsey ................ F04B 49/03
417/1

(Continued)

FOREIGN PATENT DOCUMENTS

| JP | S60078255 A | 5/1985 |
|---|---|---|
| JP | 2003202161 A | 7/2003 |

(Continued)

*Primary Examiner* — Nelson J Nieves
*Assistant Examiner* — Meraj A Shaikh
(74) *Attorney, Agent, or Firm* — Harness, Dickey & Pierce, P.L.C.

(57) ABSTRACT

A controller that controls an electric compressor, which is mounted to a vehicle and configures a two-stage compression refrigeration cycle device, has a deceleration section, an operation stop section, and a restart section. The deceleration section reduces a rotational speed of an electric motor by controlling an AC current which is output to the electric motor, when a two-stage compression mode, in which an intermediate-pressure refrigerant flows into the electric compressor from an intermediate-pressure port, is performed and an operation stop request to stop the electric compressor is made. The operation stop section stops the electric motor after the deceleration section reduces the rotational speed of the electric motor. The restart section restarts the electric compressor when the operation stop request is canceled after the operation stop section stops the electric compressor.

9 Claims, 11 Drawing Sheets

(51) Int. Cl.
  F25B 1/10    (2006.01)
  F25B 49/02   (2006.01)
  H02P 6/30    (2016.01)
  F04B 49/02   (2006.01)
  F04B 35/04   (2006.01)
  F04B 49/20   (2006.01)
  F25B 5/04    (2006.01)
  F04C 18/02   (2006.01)

(52) U.S. Cl.
  CPC .................. *F25B 1/04* (2013.01); *F25B 1/10* (2013.01); *F25B 5/04* (2013.01); *F25B 49/022* (2013.01); *H02P 6/30* (2016.02); *F04B 2203/0201* (2013.01); *F04B 2203/0209* (2013.01); *F04C 18/0207* (2013.01); *F04C 2210/26* (2013.01); *F04C 2240/403* (2013.01); *F25B 2400/0409* (2013.01); *F25B 2400/0411* (2013.01); *F25B 2400/13* (2013.01); *F25B 2400/23* (2013.01); *F25B 2600/2501* (2013.01); *F25B 2600/2509* (2013.01); *F25B 2700/1931* (2013.01); *F25B 2700/2104* (2013.01); *F25B 2700/2106* (2013.01); *F25B 2700/2117* (2013.01)

(58) Field of Classification Search
  CPC .......... F04C 2270/051; F04C 2270/075; F04C 2270/095; F04C 2270/105; F04C 2270/02; F04C 2270/05; F04C 2270/07; F04C 2270/08; F04B 2203/02; F04B 2203/0202; F04B 2203/0204; F04B 2203/0208
  See application file for complete search history.

(56) References Cited

U.S. PATENT DOCUMENTS

| | | |
|---|---|---|
| 2006/0222510 A1 | 10/2006 | Lifson et al. |
| 2013/0312447 A1 | 11/2013 | Inaba et al. |
| 2015/0155806 A1* | 6/2015 | Tsukamoto ............. F04B 49/06 318/400.11 |

FOREIGN PATENT DOCUMENTS

| | | |
|---|---|---|
| JP | 2005297706 A | 10/2005 |
| JP | 2006205959 A | 8/2006 |
| JP | 2008524497 A | 7/2008 |
| JP | 2010117072 A | 5/2010 |
| JP | 2010196975 A | 9/2010 |
| JP | 2012181005 A | 9/2012 |

* cited by examiner

ELECTRIC COMPRESSOR CONTROLLER AND REFRIGERATION CYCLE DEVICE

CROSS REFERENCE TO RELATED APPLICATIONS

This application is a U.S. National Phase Application under 35 U.S.C. 371 of International Application No. PCT/JP2016/072182 filed on Jul. 28, 2016 and published in Japanese as WO 2017/022626 A1 on Feb. 9, 2017. This application is based on and claims the benefit of priority from Japanese Patent Application No. 2015-151927 filed on Jul. 31, 2015. The entire disclosures of all of the above applications are incorporated herein by reference.

TECHNICAL FIELD

The present disclosure relates to an electric compressor controller mounted to a vehicle and a refrigeration cycle device mounted to a vehicle.

BACKGROUND ART

Patent Literature 1 discloses a vehicle-mounted refrigeration device including a gas injection cycle, i.e., a two-stage compression refrigeration cycle. The refrigeration device uses a compressor that compresses refrigerant by using a driving force of an engine.

On the other hand, an electric compressor, which is driven by an electric motor, is mounted to a vehicle air conditioner for a vehicle since an electric vehicle such as an electric car and a hybrid car is popular in recent years. For example, in the hybrid vehicle, the air conditioner can be operated even when the engine is stopped by using the electric compressor.

PRIOR ART LITERATURES

Patent Literature

Patent Literature 1: JP 2010-117072 A

SUMMARY OF INVENTION

Here, the following abnormalities may occur when the electric motor, which is driven by the electric motor, is used in the vehicle air conditioner that is mounted to the electric vehicle such as the electric car and the hybrid car and has a two-stage compression refrigeration cycle.

The electric compressor, which configures a gas injection cycle, draws a low-pressure refrigerant from a suction port, compresses the low-pressure refrigerant in a compression mechanism to be a high-pressure refrigerant, and discharges the high-pressure refrigerant from a discharge port in a two-stage compression mode. The electric compressor draws an intermediate-pressure refrigerant from the refrigeration cycle into the compression mechanism through an intermediate-pressure port such that the intermediate-pressure refrigerant joins a refrigerant being compressed in the compression mechanism. The two-stage compression mode is an operation mode in the two-stage compression refrigeration cycle.

The vehicle has a power source mounted to the vehicle, and the power source supplies power to the electric compressor. Accordingly, the electric compressor is possibly stopped temporary to secure power supplied from the power source to another device such as a main machine mounted to the vehicle.

However, when the electric compressor is stopped temporary in the two-stage compression mode, the refrigerant flows backward due to a pressure difference between a pressure of the intermediate-pressure refrigerant and a pressure of a suction refrigerant. As a result, the electric compressor is kept rotating in a reversed rotational direction for a long time. The electric compressor cannot be restarted while rotating in the reversed rotational direction. That is, the electric compressor can be restarted after the electric compressor stops rotating in the reversed rotational direction. When the electric compressor is restarted while rotating in the reversed rotational direction, the restart of the electric compressor is failed. When the restart is failed, it should wait for a specified time period, i.e., for a waiting time, until the electric compressor is ready for getting restarted so as to protect the electric compressor.

Therefore, even when an operation stop request, which requests to stop the electric compressor, is canceled, the electric compressor cannot be restarted until the electric compressor stops rotating in the reversed rotational direction or until the above-described waiting time elapses. In this situation, an interior blower blows air into a vehicle compartment while the electric compressor is stopped, whereby a temperature of the air falls drastically and a comfortable feeling of a passenger may deteriorate.

Such a problem is not described in Patent Literature 1 described above.

It is an objective of the present disclosure to provide an electric compressor controller and a refrigeration cycle device that can restart an electric compressor promptly when the electric compressor is restarted after being stopped temporary in a two-stage compression mode.

According to a first example of the present disclosure, an electric compressor controller that controls an electric compressor mounted to a vehicle and configuring a two-stage compression refrigeration cycle has a configuration set forth below.

The electric compressor has a compression mechanism, an electric motor, a suction port, a discharge port, and an intermediate-pressure port. The compression mechanism is configured to compress a refrigerant and is operated by the electric motor. The electric compressor is configured to draw a low-pressure refrigerant from the suction port, compress the low-pressure refrigerant in the compression mechanism to be a high-pressure refrigerant, and discharge the high-pressure refrigerant from the discharge port. The electric compressor is configured to draw an intermediate-pressure refrigerant, which has an intermediate pressure between a pressure of the low-pressure refrigerant and a pressure of the high-pressure refrigerant, from the intermediate pressure port to join a refrigerant being compressed in the compression mechanism. The electric motor is an AC motor using an AC current.

The electric compressor has a deceleration section, an operation stop section, and a restart section. The deceleration section reduces a rotational speed of the electric motor by controlling the AC current which is output to the electric motor, when a two-stage compression mode, in which the intermediate-pressure refrigerant flows into the electric compressor from the intermediate-pressure port, is performed and an operation stop request to stop the electric compressor is made. The operation stop section stops the electric motor after the deceleration section reduces the rotational speed of the electric motor. The restart section restarts the electric compressor when the operation stop request is canceled after the operation stop section stops the electric compressor.

The controller reduces the speed of the electric motor and then stops the electric motor when the operation stop request to stop the electric compressor is made during the driving of the electric compressor in the two-stage compression mode. In this way, it is possible to decrease a pressure difference between the refrigerant at the intermediate-pressure port and the refrigerant at the suction port compared to a case where the electric motor is stopped without reducing the rotational speed. Therefore, a time period, which is required to reverse the rotational direction and is caused due to the pressure difference, can be shortened when the electric motor is stopped. Thus, a time period from a time where the operation stop request requesting to stop the compressor is made to a time where the electric motor is stopped can be shortened.

As a result, the electric compressor can be restarted promptly when the operation stop request, which requests to stop the compressor, is canceled.

According to an another example of the present disclosure, an electric compressor controller that controls an electric compressor mounted to a vehicle and configuring a two-stage compression refrigeration cycle has a configuration set forth below.

The electric compressor has a compression mechanism, an electric motor, a suction port, a discharge port, and an intermediate-pressure port. The compression mechanism is configured to compress a refrigerant and is operated by the electric motor. The electric compressor is configured to draw a low-pressure refrigerant from the suction port, compress the low-pressure refrigerant in the compression mechanism to be a high-pressure refrigerant, and discharge the high-pressure refrigerant from the discharge port. The electric compressor is configured to draw an intermediate-pressure refrigerant, which has an intermediate pressure between a pressure of the low-pressure refrigerant and a pressure of the high-pressure refrigerant, from the intermediate pressure port to join a refrigerant being compressed in the compression mechanism. The electric motor is an AC motor using an AC current.

The electric compressor controller has a deceleration section, a rotation stop section, and a restart section. The deceleration section reduces a rotational speed of the electric motor by controlling the AC current which is output to the electric motor, when a two-stage compression mode, in which the intermediate-pressure refrigerant flows into the electric compressor from the intermediate-pressure port, is performed and an electric power decreasing request that requests to decrease electric power being supplied to the electric compressor is made. The rotation stop section controls the rotational speed of the electric motor to be zero by controlling the AC current applied to the electric motor after the deceleration section reduces the rotational speed of the electric motor. The restart section restarts the electric compressor when the electric power decreasing request is canceled after the rotation stop section controls the rotational speed to be zero.

According to the above-described configuration, the electric compressor controller reduces the rotational speed of the electric motor and then stops the electric motor such that the rotational speed becomes zero when the electric compressor is being operated in the two-stage compression mode and the electric power decreasing request, which requests to decrease the electric power being supplied to the electric compressor, is made. The rotation stop section estimates a position of a rotor when the electric power decreasing request is canceled, such that the compressor is restarted promptly.

According to another example of the present disclosure, a two-stage compression refrigeration cycle device mounted to a vehicle has an electric compressor, a radiator, a first pressure reducer, a gas-liquid separator, a second pressure reducer, an exterior heat exchanger, an intermediate-pressure refrigerant passage, and a controller. The electric compressor has a compression mechanism, an electric motor, a suction port, a discharge port, and an intermediate-pressure port. The compression mechanism compresses a refrigerant. The electric motor operates the compression mechanism. The electric compressor is configured to draw a low-pressure refrigerant from the suction port, compress the low-pressure refrigerant in the compression mechanism to be a high-pressure refrigerant, and discharge the high-pressure refrigerant from the discharge port. The electric compressor is configured to draw an intermediate-pressure refrigerant, which has an intermediate pressure between a pressure of the low-pressure refrigerant and a pressure of the high-pressure refrigerant, from the intermediate pressure port to join a refrigerant being compressed in the compression mechanism. The radiator dissipates heat of the high-pressure refrigerant, which is discharged from the discharge port, by performing a heat exchange between the high-pressure refrigerant and air which is blown into a vehicle compartment. The first pressure reducer decompresses a refrigerant, which flows from the radiator, to be the intermediate-pressure refrigerant. The gas-liquid separator separates the intermediate-pressure refrigerant, which flows from the first pressure reducer, into a gas-phase refrigerant and a liquid-phase refrigerant. The second pressure reducer decompresses the liquid-phase refrigerant, which is separated in the gas-liquid separator, to be the low-pressure refrigerant. The exterior heat exchanger is configured to evaporate a refrigerant, which flows from the second pressure reducer, by performing a heat exchange between the refrigerant and an outside air flowing from an outside of the vehicle compartment, and then guide the refrigerant to flow to the suction port. The intermediate-pressure refrigerant passage guides the gas-phase refrigerant, which is separated in the gas-liquid separator, to the intermediate-pressure port. The controller is configured to control the electric compressor. The electric motor is an AC motor using an AC current. The controller has a deceleration section, an operation stop section, and a restart section. The deceleration section reduces a rotational speed of the electric motor by controlling the AC current which is output to the electric motor, when a two-stage compression mode, in which the intermediate-pressure refrigerant flows into the electric compressor from the intermediate-pressure port, is performed and an operation stop request to stop the electric compressor is made. The operation stop section stops the electric motor after the deceleration section reduces the rotational speed of the electric motor. The restart section restarts the electric compressor when the operation stop request is canceled after the operation stop section stops the electric compressor.

According to the above-described configuration, the electric compressor can be restarted promptly after the operation stop request is canceled. As a result, when the electric compressor is stopped temporary, a decrease of a temperature of the air blown into the vehicle compartment can be small.

According to another example of the present disclosure, a two-stage compression refrigeration cycle device mounted to a vehicle has an electric compressor, a radiator, a first pressure reducer, a gas-liquid separator, a second pressure reducer, an exterior heat exchanger, an intermediate-pressure refrigerant passage, and a controller. The electric compressor has a compression mechanism, an electric motor, a suction port, a discharge port, and an intermediate-pressure port. The compression mechanism compresses a refrigerant. The electric motor operates the compression mechanism. The electric compressor is configured to draw a low-pressure refrigerant from the suction port, compress the low-pressure refrigerant in the compression mechanism to be a high-pressure refrigerant, and discharge the high-pressure refrigerant from the discharge port. The electric compressor is configured to draw an intermediate-pressure refrigerant, which has an intermediate pressure between a pressure of the low-pressure refrigerant and a pressure of the high-pressure refrigerant, from the intermediate pressure port to join a refrigerant being compressed in the compression mechanism. The radiator dissipates heat of the high-pressure refrigerant, which is discharged from the discharge port, by performing a heat exchange between the high-pressure refrigerant and air which is blown into a vehicle compartment. The first pressure reducer decompresses a refrigerant, which flows from the radiator, to be the intermediate-pressure refrigerant. The gas-liquid separator separates the intermediate-pressure refrigerant, which flows from the first pressure reducer, into a gas-phase refrigerant and a liquid-phase refrigerant. The second pressure reducer decompresses the liquid-phase refrigerant, which is separated in the gas-liquid separator, to be the low-pressure refrigerant. The exterior heat exchanger is configured to evaporate a refrigerant, which flows from the second pressure reducer, by performing a heat exchange between the refrigerant and an outside air flowing from an outside of the vehicle compartment, and then guide the refrigerant to flow to the suction port. The intermediate-pressure refrigerant passage guides the gas-phase refrigerant, which is separated in the gas-liquid separator, to the intermediate-pressure port. The controller is configured to control the electric compressor. The electric motor is an AC motor using an AC current. The controller has a deceleration section, a rotation stop section, and a restart section. The deceleration section reduces a rotational speed of the electric motor by controlling the AC current which is output to the electric motor, when a two-stage compression mode, in which the intermediate-pressure refrigerant flows into the electric compressor from the intermediate-pressure port, is performed and an electric power decreasing request that requests to decrease electric power being supplied to the electric compressor is made. The rotation stop section controls the rotational speed of the electric motor to be zero by controlling the AC current applied to the electric motor after the deceleration section reduces the rotational speed of the electric motor. The restart section restarts the electric compressor when the electric power decreasing request is canceled after the rotation stop section controls the rotational speed to be zero.

According to the above-described configuration, the rotation stop section estimates a position of a rotor when the electric power decreasing request is canceled, such that the compressor is restarted promptly. As a result, when the electric compressor is stopped temporary, a decrease of a temperature of the air blown into the vehicle compartment can be small.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number.

First Embodiment

Figure 1:
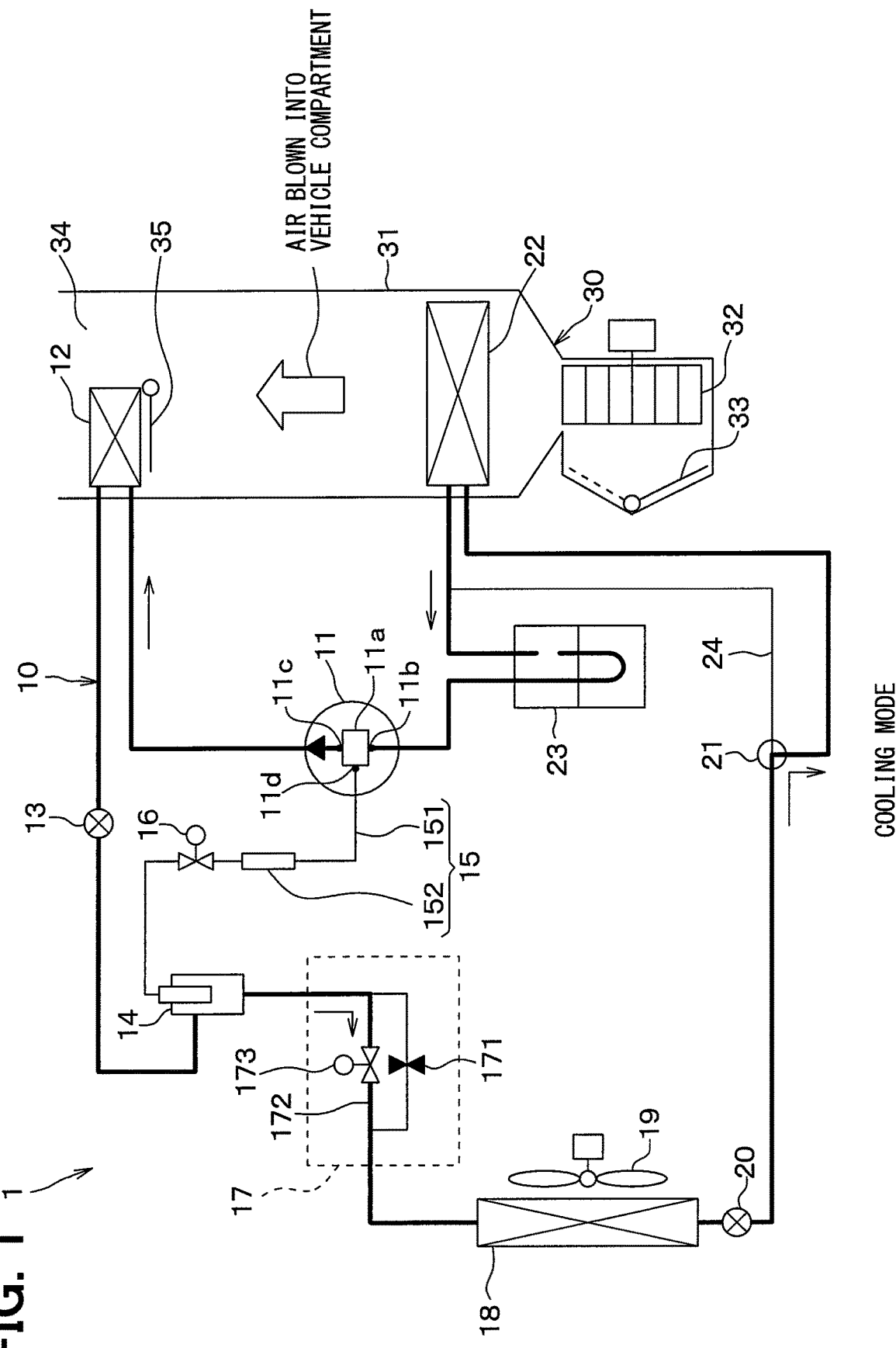
FIG. 1 is a diagram illustrating a whole configuration of an air conditioning device for a vehicle in a first embodiment and illustrating a flow of refrigerant in a cooling mode.
Figure 2:
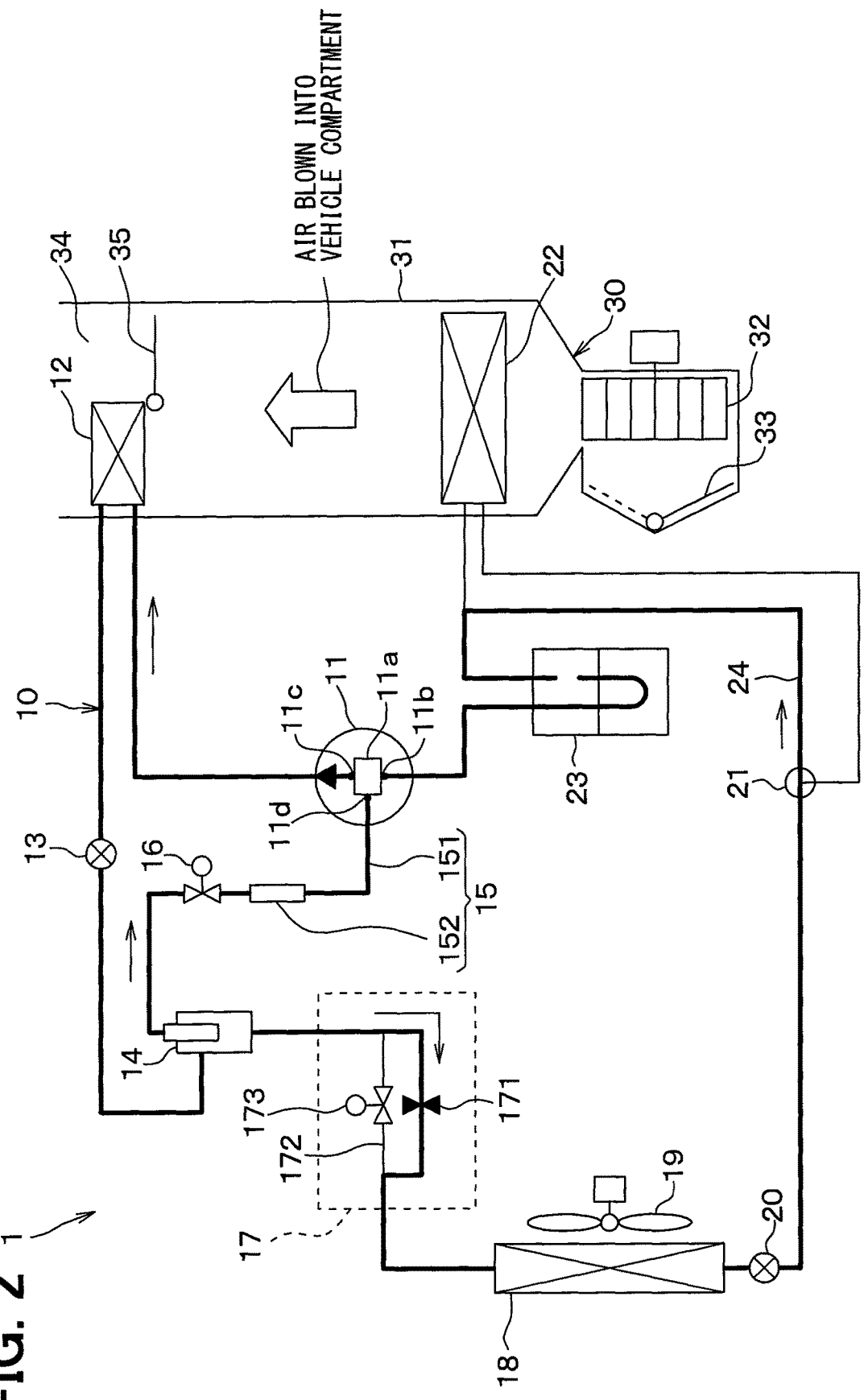
FIG. 2 is a diagram illustrating the whole configuration of the air conditioning device for the vehicle in the first embodiment and illustrating a flow of refrigerant in a first heating mode (i.e., two-stage compression mode).
Figure 3:
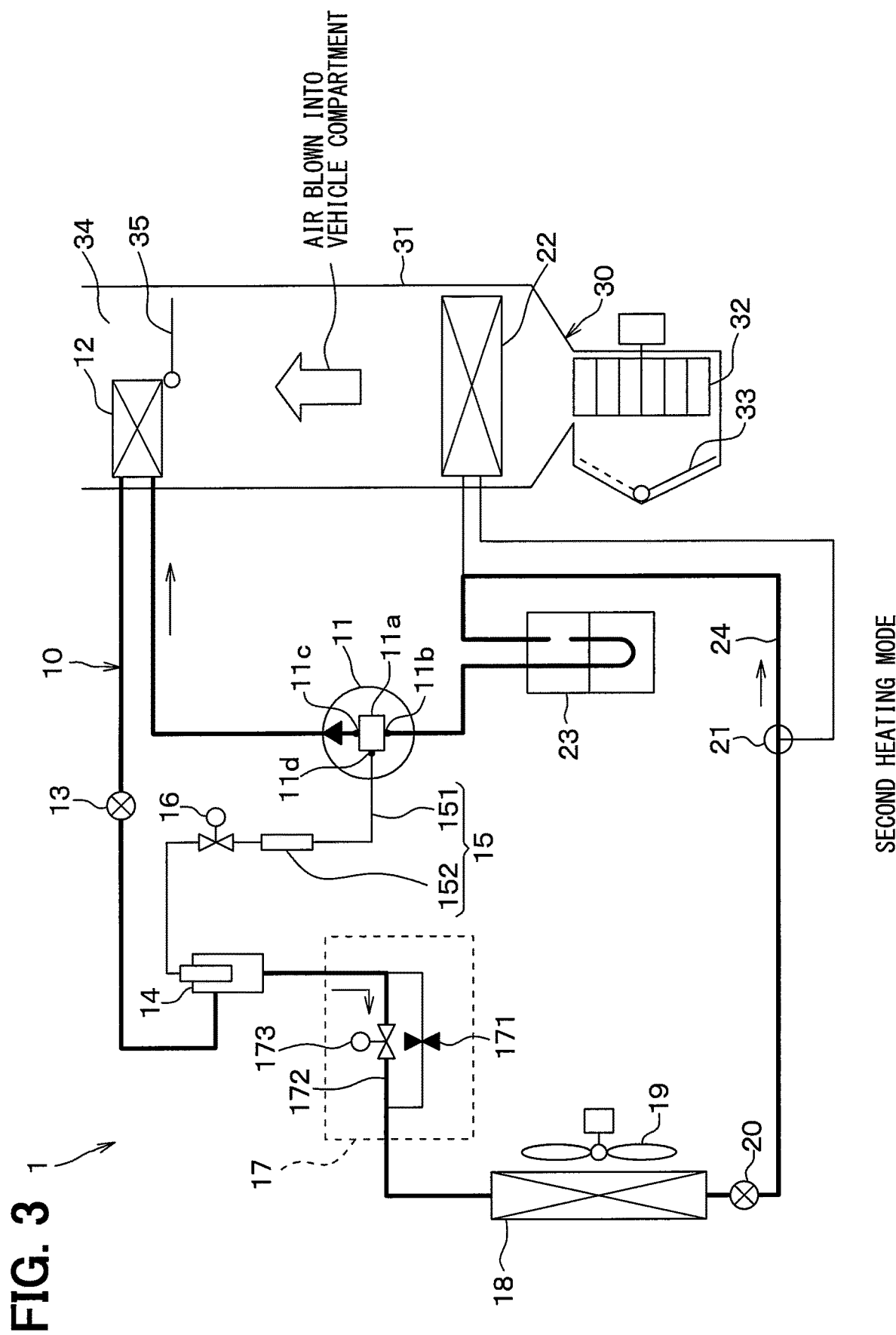
FIG. 3 is a diagram illustrating the whole configuration of the air conditioning device for the vehicle in the first embodiment and illustrating a flow of refrigerant in a second heating mode.

An air conditioning device 1 for a vehicle of the present embodiment shown in FIGS. 1 to 3 is applied to a hybrid vehicle that obtains driving force for traveling of the vehicle from an internal combustion engine (i.e., an engine) and an electric motor for traveling. The air conditioning device 1 for the vehicle includes a heat pump cycle 10 and an interior air conditioning unit 30.

The heat pump cycle 10 in the air conditioning device 1 for the vehicle performs a function of cooling or heating interior blown air blown into a vehicle compartment that is a space to be air conditioned. Therefore, the heat pump cycle 10 can switch between a refrigerant circuit for a cooling mode for cooling the interior blown air to cool an inside of the vehicle compartment as shown in FIG. 1 and a refrigerant circuit for first and second heating modes for heating the interior blown air to heat the inside of the vehicle interior as shown in FIGS. 2 and 3. The refrigerant circuit for the first heating mode configures a two-stage compression refrigeration cycle device. The first heating mode is a heating mode performed when an outside air temperature is extremely low, e.g., a temperature of 0° C. or lower degree. The second heating mode is a normal heating mode.

The heat pump cycle 10 employs normal fluorocarbon refrigerant as the refrigerant and configures a vapor compression subcritical refrigeration cycle in which a pressure of high-pressure refrigerant does not exceed a critical pressure of the refrigerant.

The heat pump cycle 10 of the present embodiment includes a compressor 11, an interior condenser 12, a first pressure reducer 13, a gas-liquid separator 14, an intermediate-pressure refrigerant passage 15, an intermediate-pressure switching valve 16, a second pressure reducer 17, an exterior heat exchanger 18, a third pressure reducer 20, a three-way valve 21, an interior evaporator 22, an accumulator 23, and a second bypass passage 24.

The compressor 11 is a vehicle-mounted electric compressor that is disposed under a hood of the vehicle, draws, compresses, and discharges the refrigerant in the heat pump cycle 10.

The compressor 11 includes a compression chamber 11a, a suction port 11b that draws low-pressure refrigerant into the compression chamber 11a, a discharge port 11c that discharges the high-pressure refrigerant from the compression chamber 11a, and an intermediate-pressure port 11d that guides intermediate-pressure refrigerant in the heat pump cycle 10 into the compression chamber 11a and causes the intermediate-pressure refrigerant to join the refrigerant in a compression process. The intermediate-pressure refrigerant is a refrigerant having a pressure between a pressure of the low-pressure refrigerant drawn into the compression chamber 11a and a pressure of the high-pressure refrigerant discharged from the compression chamber 11a.

Figure 4:
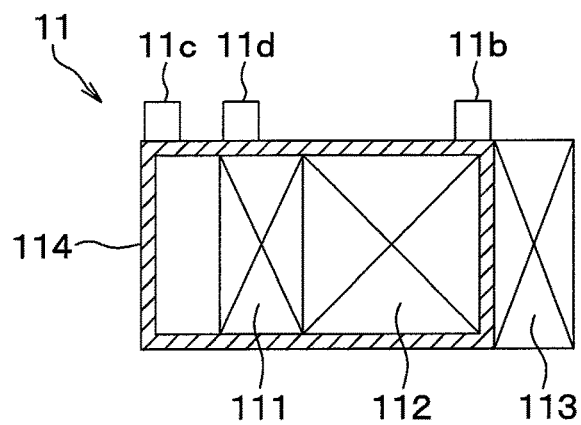
FIG. 4 is a cross-sectional view illustrating a configuration of a compressor in the first embodiment.

More specifically, as shown in FIG. 4, the compressor 11 includes a compression mechanism 111 that compresses the refrigerant in the compression chamber 11a, the electric motor 112 that drives the compression mechanism 111 for rotation, and an inverter device (hereinafter referred to as "inverter") 113 that is a operation control circuit of the electric motor 112. The compression mechanism 111 and the electric motor 112 are housed in a housing 114. The inverter 113 is disposed outside the housing 114 to be adjacent to the housing 114.

Figure 5:
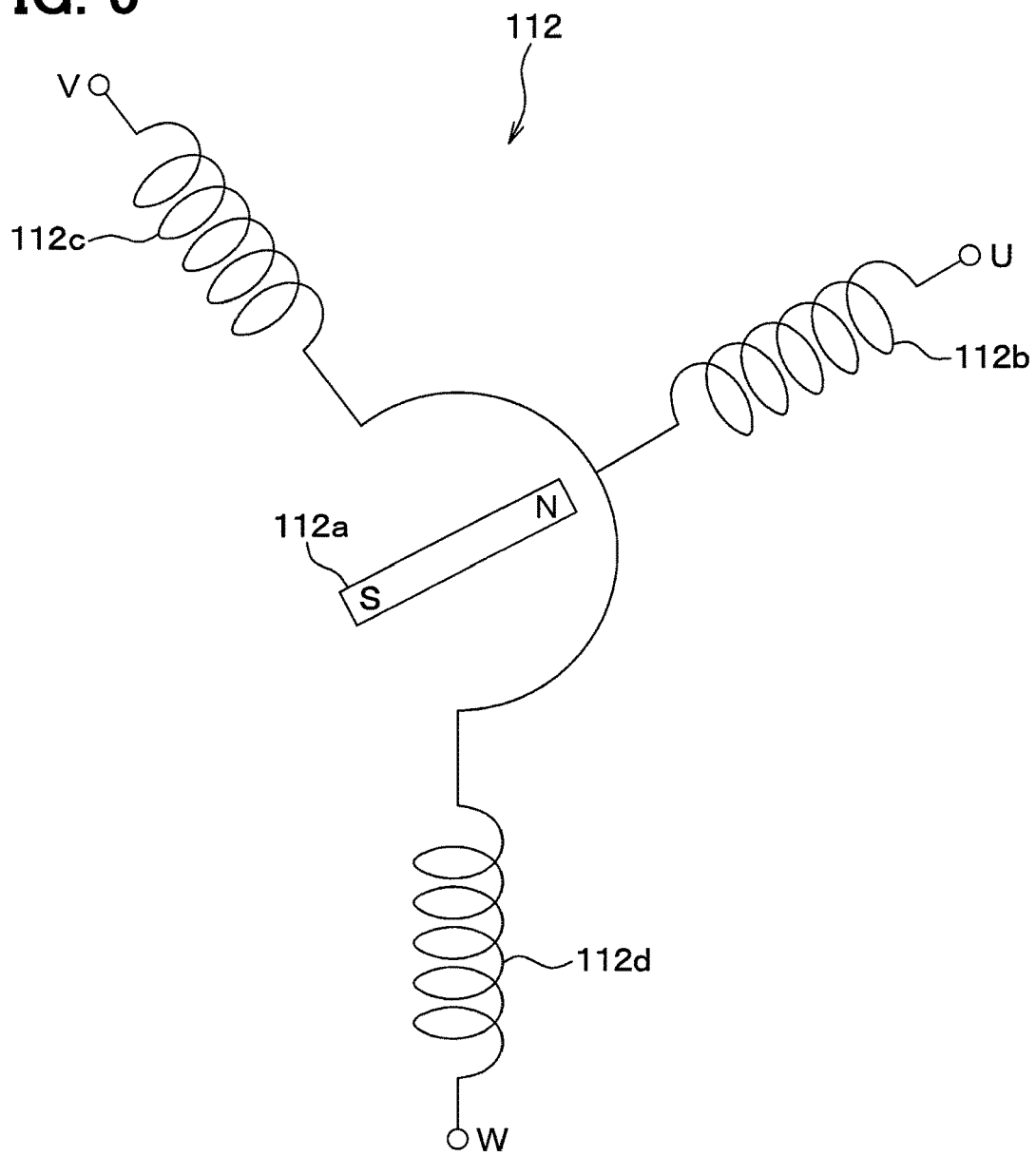
FIG. 5 is a diagram illustrating a configuration of an electric motor in the first embodiment.

A scroll compression mechanism is employed as the compression mechanism 111. However, the compression mechanism 111 is not limited to the scroll compression mechanism. Other compression mechanisms such as a vane compression mechanism may be employed as the compression mechanism 111 as long as the compression mechanism is of rotary-type The electric motor 112 is a three-phase AC synchronous motor. A rotational speed of the electric motor 112 is controlled by three-phase AC power, i.e., AC currents output from the inverter 113. As shown in FIG. 5, the electric motor 112 includes a rotor 112a and stator coils 112b, 112c, and 112d. The rotor 112a is fixed to a rotating shaft (not shown) that transmits rotary power to the compression mechanism 111. The rotor 112a rotates with the rotating shaft (not shown) based on rotating magnetic fields generated from the stator coils 112b, 112c, and 112d. The stator coils are configured by a U-phase coil 112b, a V-phase coil 112c, and a W-phase coil 112d that are star-connected to each other. The U-phase coil 112b, the V-phase coil 112c, and the W-phase coil 112d are connected to the inverter 113. The inverter 113 is connected to a high-voltage power supply that supplies power to main machines such as an electric motor for traveling and outputs the AC currents based on a control signal representing a target rotational speed output from an air conditioning ECU 40 (described later).

The housing 114 is provided with the suction port 11b, the discharge port 11c, and the intermediate-pressure port 11d, and gas-phase refrigerant flows from the suction port 11b toward the discharge port 11c in the housing 114. The intermediate-pressure port 11d communicates with a middle position in the compression process in the compression chamber 11a.

In this manner, the compressor 11 of the present embodiment compresses the low-pressure refrigerant drawn from the suction port 11b into the high-pressure refrigerant by use of the compression mechanism 111 and discharges the high-pressure refrigerant from the discharge port 11c. Furthermore, the compressor 11 causes the intermediate-pressure refrigerant in the cycle to flow in from the intermediate-pressure port 11d and join the refrigerant in the compression process.

The interior condenser 12 has a refrigerant inlet connected to the discharge port 11c of the compressor 11 and is disposed in a case 31 of the interior air conditioning unit 30 (described later). The interior condenser 12 is a radiator that performs heat exchange between the high-pressure discharged refrigerant (i.e., high-pressure refrigerant) discharged from the compressor 11 and the interior blown air, radiates the heat from the discharged refrigerant, and then heats the interior blown air passing through the interior evaporator 22 (described later).

The first pressure reducer 13 has a refrigerant inlet connected to a refrigerant outlet of the interior condenser 12. The first pressure reducer 13 reduces a pressure of the refrigerant flowing out of the interior condenser 12 until the refrigerant becomes intermediate-pressure refrigerant in the first heating mode. The first pressure reducer 13 reduces the refrigerant flowing out of the interior condenser 12 until the refrigerant becomes low-pressure refrigerant in the second heating mode. The first pressure reducer 13 is an electric expansion valve. In other words, the first pressure reducer 13 is an electric variable throttle mechanism having a valve element with variable throttle opening and an electric actuator that changes the throttle opening of the valve element. The first pressure reducer 13 can be brought into a throttling state for exerting a pressure reducing effect or a fully open state for not exerting the pressure reducing effect.

The gas-liquid separator 14 has a refrigerant inlet connected to a refrigerant outlet of the first pressure reducer 13. The gas-liquid separator 14 separates the refrigerant passing through the first pressure reducer 13 into a gas-phase refrigerant and a liquid-phase refrigerant. The gas-liquid separator 14 of the present embodiment is of a centrifugal separation type that separates the refrigerant into a gas-phase refrigerant and a liquid-phase refrigerant by the action of centrifugal force. The intermediate-pressure refrigerant passage 15 is connected to a gas-phase refrigerant outlet of the gas-liquid separator 14. A refrigerant inlet of the second pressure reducer 17 is connected to a liquid-phase refrigerant outlet of the gas-liquid separator 14.

The intermediate-pressure refrigerant passage 15 is a refrigerant flow path that guides the gas-phase refrigerant separated by the gas-liquid separator 14 to the intermediate-pressure port 11d of the compressor 11. The intermediate-pressure refrigerant passage 15 is configured by refrigerant piping 151 and a muffler 152. The muffler 152 is a flow path forming member that reduces pulsation of the refrigerant in the intermediate-pressure refrigerant passage 15 and has a larger capacity than the refrigerant piping 151.

The intermediate-pressure switching valve 16 is a switching valve that is provided to the intermediate-pressure refrigerant passage 15 and opens and closes the intermediate-pressure refrigerant passage 15. The intermediate-pressure switching valve 16 of the present embodiment is a solenoid valve. Opening/closing operation of the intermediate-pressure switching valve 16 is controlled based on a control signal output from the air conditioning ECU 40 (described later). As described later, the intermediate-pressure switching valve 16 is brought into an open state in the first heating mode in order to form a refrigerant circuit for a two-stage compression mode for introducing the intermediate-pressure refrigerant into the intermediate-pressure port 11d.

The second pressure reducer 17 reduces a pressure of the intermediate-pressure liquid-phase refrigerant separated in the gas-liquid separator 14 until the refrigerant becomes low-pressure refrigerant in the first heating mode. The second pressure reducer 17 does not exert a pressure reducing effect on the refrigerant in the cooling mode and the second heating mode. The second pressure reducer 17 can be brought into a throttling state in which the pressure reducing effect is exerted or a fully open state in which the pressure reducing effect is not exerted.

The second pressure reducer 17 of the present embodiment is configured by a fixed throttle 171, a first bypass passage 172, and an switching valve 173. The fixed throttle 171 reduces the pressure of the refrigerant. The fixed throttle 17 may be a nozzle, an orifice, or the like with fixed throttle opening. The first bypass passage 172 is a refrigerant flow path that causes the refrigerant flowing out of the gas-liquid separator 14 to detour around the fixed throttle 171 and guides the refrigerant to the exterior heat exchanger 18. The switching valve 173 is an electromagnetic valve that opens and closes the first bypass passage 172. Opening/closing operation of the switching valve 173 is controlled based on a control signal output from the air conditioning ECU 40. The second pressure reducer 17 of the present embodiment can be brought into a throttling state for exerting a pressure reducing effect or a fully open state for not exerting the pressure reducing effect depending on opening/closing of the switching valve 173.

The exterior heat exchanger 18 has a refrigerant inlet connected to a refrigerant outlet of the second pressure reducer 17. The exterior heat exchanger 18 is disposed under the vehicle hood, i.e., outside the vehicle compartment, and performs heat exchange between the refrigerant flowing through itself and air outside the vehicle compartment (i.e., outside air) blown by a blower fan 19. The exterior heat exchanger 18 functions as an evaporator that evaporates the low-pressure refrigerant and exerts a heat absorbing effect in the first and second heating modes. The exterior heat exchanger 18 functions as a radiator that radiates heat from the high-pressure refrigerant in the cooling mode.

The third pressure reducer 20 has a refrigerant inlet connected to a refrigerant outlet of the exterior heat exchanger 18. The third pressure reducer 20 reduces a pressure of the refrigerant flowing out of the exterior heat exchanger 18 and flowing into the interior evaporator 22 in the cooling mode. The third pressure reducer 20 is an electric expansion valve having the same configuration as the first pressure reducer 13.

The three-way valve 21 has a refrigerant inlet connected to a refrigerant outlet of the third pressure reducer 20 and two refrigerant outlets respectively connected to a refrigerant inlet of the interior evaporator 22 and a refrigerant inlet of the accumulator 23. The three-way valve 21 is a refrigerant flow path switching device that switches between a refrigerant flow path that guides the refrigerant flowing out of the third pressure reducer 20 to the interior evaporator 22 and the second bypass passage 24 that causes the refrigerant flowing out of the third pressure reducer 20 to detour around the interior evaporator 22 and guides the refrigerant to the accumulator 23. The three-way valve 21 is an electric three-way valve. Actuation of the three-way valve 21 is controlled by a control signal output from the air conditioning ECU 40.

The interior evaporator 22 is disposed on an upstream side of the interior condenser 12 in an air flow direction in the case 31 of the interior air conditioning unit 30. The interior evaporator 22 is a heat exchanger that performs heat exchange between the refrigerant flowing through itself and the interior blown air in the cooling mode. Accordingly, the refrigerant absorbs heat and evaporates to cool the interior blown air by a heat absorbing effect of the refrigerant.

The accumulator 23 has the refrigerant inlet connected to a refrigerant outlet of the interior evaporator 22 and the second bypass passage 24. The accumulator 23 is a gas-liquid separator that separates the refrigerant flowing into itself into a gas-phase refrigerant and a liquid-phase refrigerant and stores excess refrigerant in the cycle. The suction port 11b of the compressor 11 is connected to a gas-phase refrigerant outlet of the accumulator 23.

Next, the interior air conditioning unit 30 will be described. The interior air conditioning unit 30 blows the interior blown air at an adjusted temperature into the vehicle compartment. The interior air conditioning unit 30 is disposed inside a dashboard panel (i.e., an instrument panel) at a most front portion in the vehicle compartment. The interior air conditioning unit 30 is configured by disposing a blower 32, the above-described interior condenser 12, the interior evaporator 22, and the like in the case 31 forming an outer shell of the interior air conditioning unit 30.

The case 31 forms therein an air passage for the interior blown air. An inside/outside air switching device 33 that switches between and introduces the air in the vehicle compartment (i.e., inside air) and the outside air is disposed on a most upstream side in the case 31 in the air flow direction of the interior blown air.

The blower 32 that blows the air drawn through the inside/outside air switching device 33 toward the inside of the vehicle compartment is disposed on a downstream side of the inside/outside air switching device 33 in the air flow direction. The blower 32 is an electric blower that has a centrifugal multi-blade fan driven by an electric motor.

The interior evaporator 22 and the interior condenser 12 are disposed in this order along the flow of the interior blown air on a downstream side of the blower 32 in the air flow direction. The case 31 has a bypass passage 34 that causes the interior blown air passing through the interior evaporator 22 to detour around the interior condenser 12 and pass through itself.

Moreover, an air passage switching door 35 is disposed on a downstream side of the interior evaporator 22 in the air flow direction and on an upstream side of the interior condenser 12 in the air flow direction. The air passage switching door 35 switches between an air passage passing through the interior condenser 12 and the bypass passage 34 as an air passage through which the interior blown air flows after passing through the interior evaporator 22.

Although it is not shown, an opening, which communicates with a blowing outlet provided in the vehicle compartment, is formed at a most downstream portion of the case 31 in the air flow direction. The interior blown air adjusted in temperature in the interior evaporator 22 or the interior condenser 12 flows through the opening and is blown out of the blowing outlet into the vehicle compartment.

Figure 6:
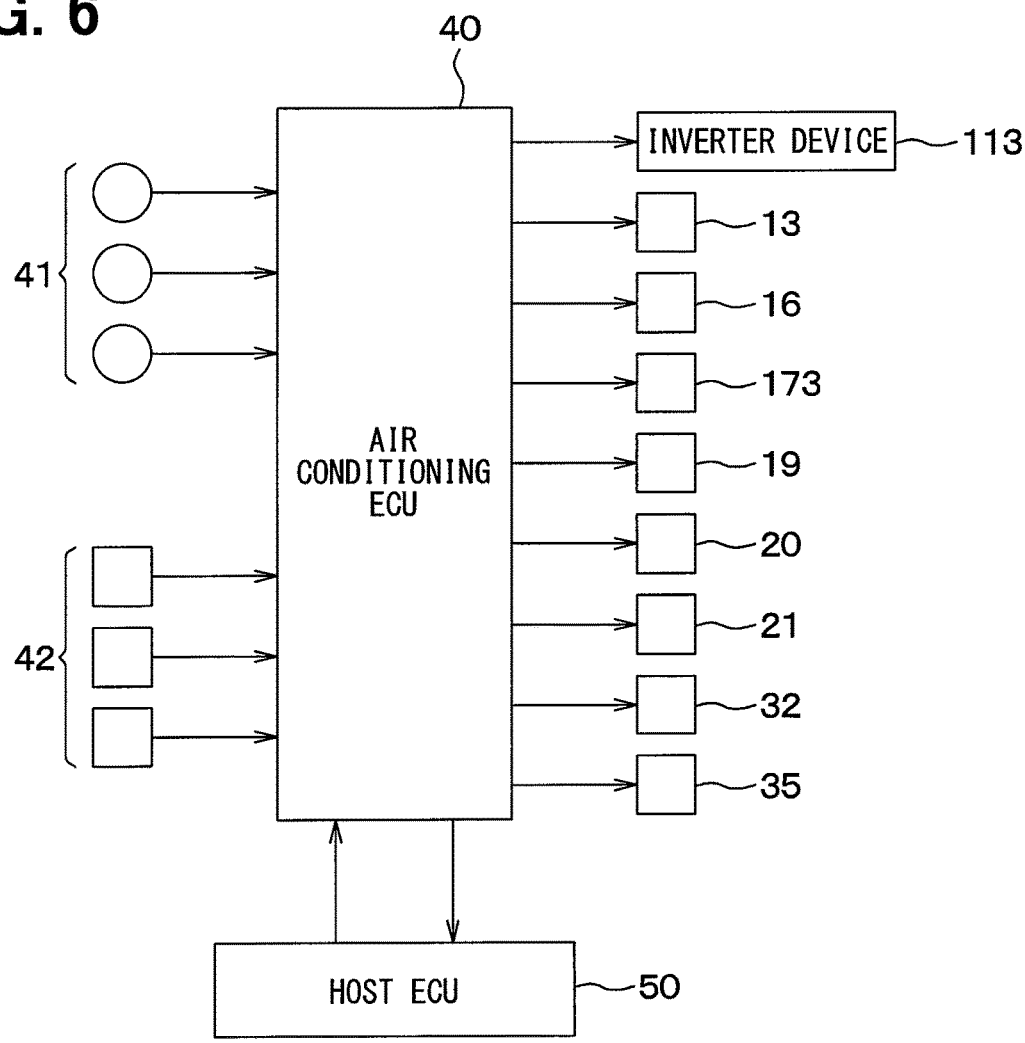
FIG. 6 is a block diagram of an electronic control unit in the first embodiment.

The air conditioning device 1 for the vehicle includes the air conditioning ECU 40 shown in FIG. 6. The air conditioning ECU 40 is an electronic control unit configured by a known microcomputer including a CPU, a ROM, RAM, and the like and peripheral circuits of the microcomputer.

The air conditioning ECU 40 has an output side connected to various devices such as the inverter 113 of the compressor 11, the first pressure reducer 13, the intermediate-pressure switching valve 16, the switching valve 173, the blower fan 19, the third pressure reducer 20, the three-way valve 21, the blower 32, and the air passage switching door 35.

On the other hand, the air conditioning ECU 40 has an input side connected to a group 41 of sensors for various air conditioning controls. The group 41 of sensors includes an inside air sensor that detects a temperature in the vehicle compartment, an outside air sensor that detects an outside air temperature, a insolation sensor that detects an insolation amount in the vehicle compartment, an evaporator temperature sensor that detects a temperature of the interior evaporator 22, a discharge pressure sensor that detects a high-pressure refrigerant pressure discharged from the compressor 11, and the like.

Furthermore, an operation panel (not shown) disposed near the dashboard panel is connected to the input side of the air conditioning ECU 40. Operation signals from various air conditioning operation switches 42 provided to the operation panel are input to the air conditioning ECU 40. Specifically, the various air conditioning operation switches 42 provided to the operation panel are an actuation switch for the air conditioning device 1 for the vehicle, a vehicle compartment temperature setting switch that sets the temperature in the vehicle compartment, a selecting switch for the cooling mode and the heating modes, and the like.

The air conditioning ECU 40 performs various computations and processing and controls operations of the various devices connected to the output side based on air conditioning control programs stored in the ROM and the like and by using sensor signals input from the group 41 of sensors and the operation signals input from the various air conditioning operation switches 42.

For example, the air conditioning ECU 40 outputs the control signal representing the target rotational speed of the compressor 11 to the inverter 113. The inverter 113 outputs AC currents at frequencies responsive to the control signal. In this way, the rotational speed of the compressor 11 is controlled. The inverter 113 of the present embodiment includes a plurality of inverter elements (i.e., switching elements) and includes a current output circuit that outputs the three-phase AC currents to the electric motor 112 and a driving ECU that controls driving of the plurality of inverter elements. The driving ECU is an electronic control unit configured by a known microcomputer including a CPU, a ROM, RAM, and the like and peripheral circuits of the microcomputer. The driving ECU controls the current output circuit, based on the control signal representing the target rotational speed from the air conditioning ECU 40. In this way, the currents respectively passed through the U-phase coil 112b, V-phase coil 112c, and W-phase coil 112d are controlled. In the present embodiment, the air conditioning ECU 40 and the inverter 113 correspond to the electronic control unit for the electric compressor.

The driving ECU performs a sensor-less operation control of the electric motor 112 without using a rotation sensor that detects a rotational position (i.e., electrical angle) of the rotor 112a. In the sensor-less operation control, a method of estimating the rotational position of the rotor 112a is a first estimation method or a second estimation method. The first estimation method is a method using induced voltages, by which the rotational position of the rotor 112a is estimated based on the induced voltages of the three phases. The second estimation method is a disturbance injection method in which sensing signals are injected into the stator coils 112b, 112c, and 112d so that the rotational position of the rotor 112a is estimated based on a response of the electric motor 112 to the sensing signals. The sensing signals are triple harmonics. The first estimation method is used when the rotational speed of the electric motor 112 (specifically, the rotor 112a) is higher than a predetermined speed. The second estimation method is used when the rotational speed of the electric motor 112 (specifically, the rotor 112a) is lower than the predetermined speed, i.e., when the electric motor 112 is rotating at an extremely low speed or stopped.

The air conditioning ECU 40 is electrically connected to a host ECU 50 and the air conditioning ECU 40 and the host ECU 50 are configured to electrically communicate with each other. Therefore, the host ECU 50 can control operations of the various devices connected to the output side of the air conditioning ECU 40 through the air conditioning ECU 40. The host ECU 50 is an electronic control unit that controls a traveling system. More specifically, the host ECU 50 controls main machines such as the motor and an engine based on a depression amount of an accelerator pedal (not shown) and the like and controls electric power supply from the power supply mounted to the vehicle to the main machines.

When electric power needs to be secured for acceleration of the vehicle, the host ECU 50 can output a signal for requesting a stop of the compressor 11 to the air conditioning ECU 40 to thereby stop the operation of the compressor 11. In this case, if the host ECU 50 does not output the signal for requesting the stop of the compressor 11, it is possible to restart the operation of the compressor 11. In the present embodiment, "the electric power needs to be secured for the acceleration of the vehicle" means that the engine for the acceleration of the vehicle is activated during traveling of the vehicle by use of the driving force from only the electric motor for traveling out of the engine and the electric motor for traveling.

Next, control processing for the various devices performed by the air conditioning ECU 40 will be described.

The air conditioning ECU 40 performs a normal operation control for controlling the various devices depending on operation modes, i.e., the cooling mode, the first heating mode, or the second heating mode. When the stop of the compressor 11 is requested by the host ECU 50, the air conditioning ECU 40 gives a higher priority to a temporary stop control for the compressor 11 than to the normal operation control and performs the temporary stop control.

Figure 7:
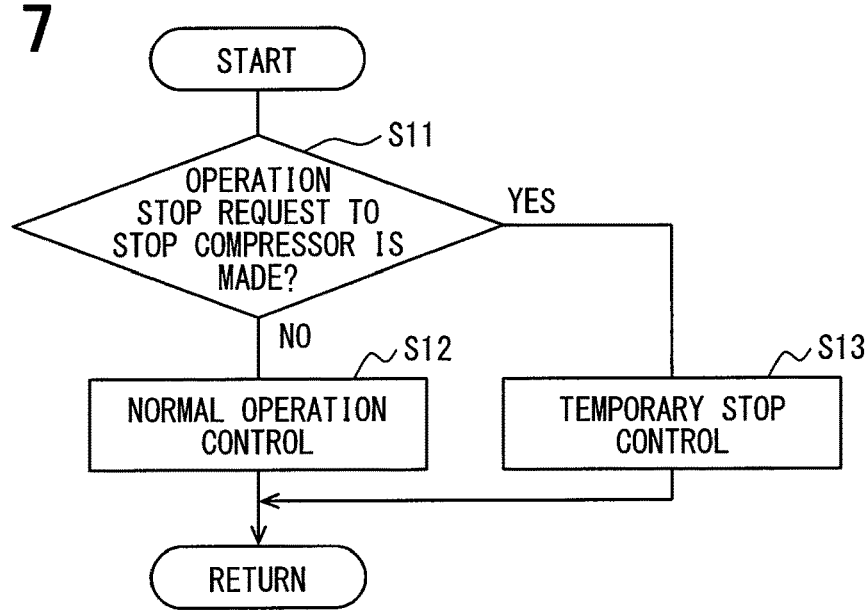
FIG. 7 is a flowchart of a control performed by the air conditioning ECU in the first embodiment.
Figure 8:
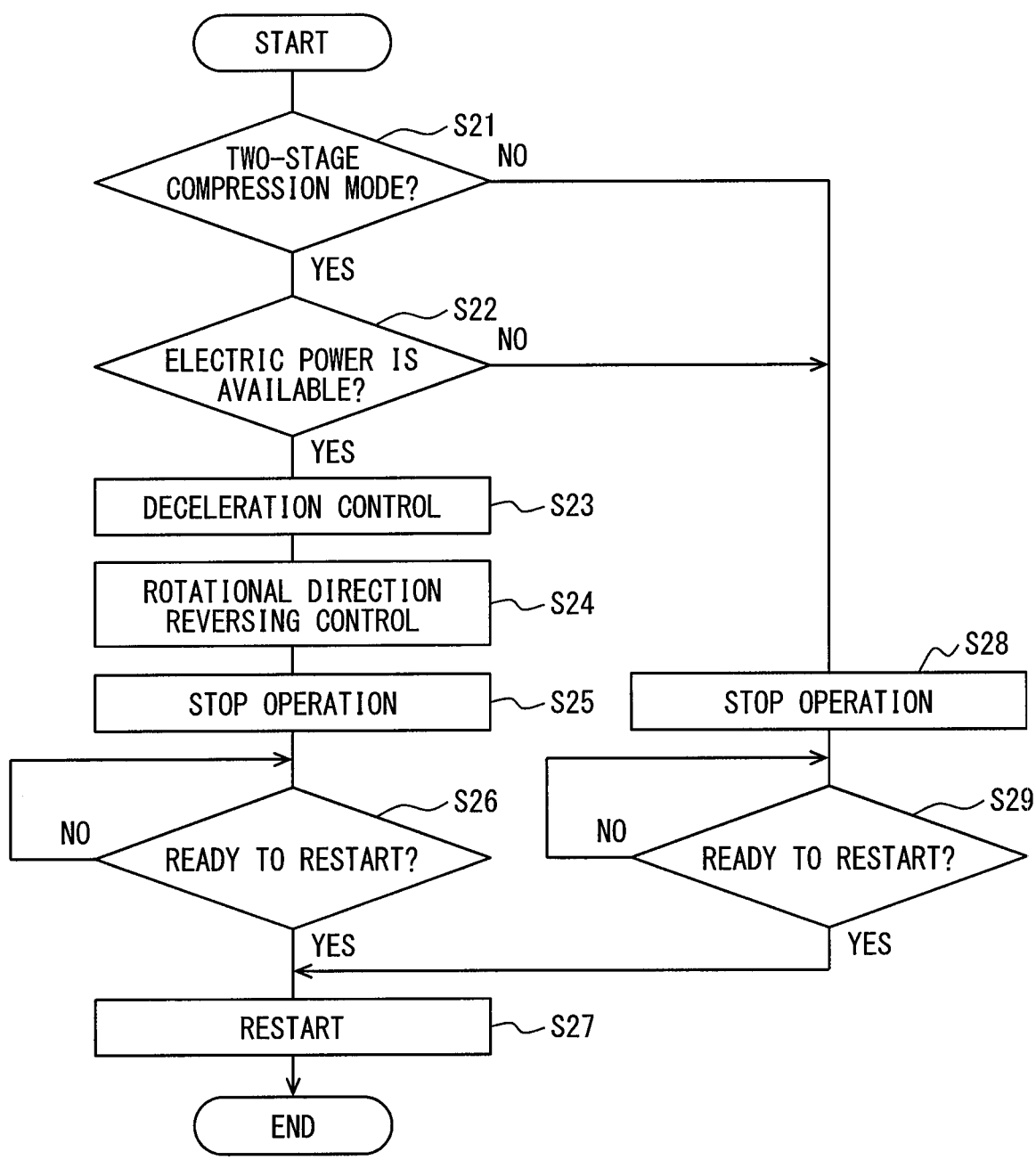
FIG. 8 is a flowchart of a temporary stop control performed by the air conditioning ECU in the first embodiment.

Specifically, the air conditioning ECU 40 performs the control processing shown in each of FIGS. 7 and 8. The control processing shown in each of FIGS. 7 and 8 is performed when an ignition switch is in an ON state, i.e., when the vehicle is in a traveling state in which the vehicle can travel, and an actuation switch on the operation panel is in an ON state. Steps shown in each of FIGS. 7 and 8 correspond to components that perform various kinds of processing.

As shown in FIG. 7, the air conditioning ECU 40 determines whether a stop request signal, which is output from the host ECU 50 and requests to stop the compressor 11, is made. When the air conditioning ECU 40 determines the stop request signal is not output from the host ECU 50, the flow advances to step S12. At step S12, it is determined to operate the normal operation control. On the other hand, when the air conditioning ECU 40 determines that the stop request signal is being output by the host ECU 50, the flow advances to step S13. At step S13, it is determined to operate the temporary stop control. Thus, the air conditioning ECU 40 performs the normal operation control and the temporary stop control depending on the above-described determinations.

Next, the normal operation control will be described. In the normal operation control, the air conditioning ECU 40 sets various refrigeration cycles corresponding to the operation modes of the heat pump cycle 10 and controls operations of the various devices in order to obtain a desired air conditioned state in each operation mode.

(A) Cooling Mode

The cooling mode is started when the cooling mode is selected by use of a selection switch in the ON state of the actuation switch on the operation panel.

In the cooling mode, the air conditioning ECU 40 brings the first pressure reducer 13 into the fully open state (i.e., the state in which the pressure reducing effect is not exerted) and brings the third pressure reducer 20 into the throttling state (i.e., the state in which the pressure reducing effect is exerted). Moreover, the air conditioning ECU 40 opens the switching valve 173 and brings the second pressure reducer 17 into the fully open state (i.e., the state in which the pressure reducing effect is not exerted). Furthermore, the air conditioning ECU 40 closes the intermediate-pressure switching valve 16 and closes the outlet of the three-way valve 21 connected to the second bypass passage 24.

The air conditioning ECU 40 calculates a target blowing temperature TAO that is a target temperature of the air to be blown into the vehicle compartment, based on detection signals from the group 41 of sensors and the operation signals from the operation panel. Then, based on the calculated target blowing temperature TAO and the detection signals from the group of sensors, the air conditioning ECU 40 determines operating states of the various devices such as the compressor 11, the blower 32, and the air passage switching door 35, and outputs the control signals so as to achieve the determined operating states. As a result, the compressor 11 and the blower 32 respectively operate at desired rotational speeds, for example. The door of the inside/outside air switching device 33 and the air passage switching door 35 are brought into desired positions. Specifically, the air passage switching door 35 is brought into such a position that the air passage through the interior condenser 12 is closed and that the entire flow rate of the blown air after passing through the interior evaporator 22 passes through the bypass passage 34.

In this way, the heat pump cycle 10 is switched to the refrigerant circuit for the cooling mode in which the refrigerant flows as shown by thick lines and arrows in FIG. 1. In other words, the refrigerant circuit in which the refrigerant discharged from the discharge port 11*c* of the compressor 11 flows through the interior condenser 12, the first pressure reducer 13 in the fully open state, the gas-liquid separator 14, the second pressure reducer 17 in the fully open state, the exterior heat exchanger 18, the third pressure reducer 20 in the throttling state, the interior evaporator 22, and the accumulator 23 in this order and then flows into the suction port 11*b* of the compressor 11 is formed.

In the cooling mode, the high-pressure refrigerant discharged from the discharge port 11*c* of the compressor 11 exchanges heat with the outside air to dissipate heat in the exterior heat exchanger 18. The refrigerant flowing out of the exterior heat exchanger 18 is reduced in pressure and expanded until the refrigerant becomes the low-pressure refrigerant in the third pressure reducer 20 and absorbs heat from the interior blown air blown from the blower 32 and evaporates in the interior evaporator 22. As a result, the interior blown air is cooled. At this time, because the air passage through the interior condenser 12 is closed with the air passage switching door 35, the high-pressure refrigerant flowing into the interior condenser 12 dissipates virtually no heat to the interior blown air and flows out of the interior condenser 12. Therefore, the interior blown air cooled in the interior evaporator 22 is blown into the vehicle compartment.

(B) Heating Modes

The heating mode is started when the heating mode is selected by use of the selection switch in the thrown state (i.e., the ON state) of the actuation switch on the operation panel, for example. The first heating mode is performed when the outside air temperature is extremely low. When the outside air temperature is not extremely low, the second heating mode is performed. For example, the air conditioning ECU 40 performs the first heating mode when the temperature, which is detected by the outside air sensor, is a reference temperature, e.g., 0° C., or lower. The air conditioning ECU 40 performs the second heating mode when the temperature detected by the outside air sensor exceeds the reference temperature.

(B1) First Heating Mode

In the first heating mode, the air conditioning ECU 40 brings the first pressure reducer 13 into the throttling state and the third pressure reducer 20 into the fully open state. The air conditioning ECU 40 closes the switching valve 173 and brings the second pressure reducer 17 into the throttling state. Furthermore, the air conditioning ECU 40 opens the intermediate-pressure switching valve 16 and opens the outlet of the three-way valve 21 connected to the second bypass passage 24.

As in the cooling mode, the air conditioning ECU 40 determines the operating states of the various devices, based on the target blowing temperature TAO and the like and outputs the control signals so as to achieve the determined operating states. As a result, the air passage switching door 35 is brought into such a position that bypass passage 34 is closed and that the entire flow rate of the blown air after passing through the interior evaporator 22 passes through the interior condenser 12.

In this way, the heat pump cycle 10 is switched to the refrigerant circuit for the first heating mode in which the refrigerant flows as shown by thick lines and arrows in FIG. 2. In other words, the high-pressure refrigerant discharged from the discharge port 11*c* of the compressor 11 is condensed in the interior condenser 12 and the condensed high-pressure refrigerant is reduced in pressure in the first pressure reducer 13 until the refrigerant becomes the intermediate-pressure refrigerant. The intermediate-pressure refrigerant flowing out of the first pressure reducer 13 is separated into the gas-phase refrigerant and the liquid-phase refrigerant in the gas-liquid separator 14. The intermediate-pressure liquid-phase refrigerant separated in the gas-liquid separator 14 is reduced in pressure in the second pressure reducer 17 until the refrigerant becomes the low-pressure refrigerant, evaporated in the exterior heat exchanger 18, and drawn into the suction port 11*b* of the compressor 11 via the accumulator 23. On the other hand, the intermediate-pressure gas-phase refrigerant separated in the gas-liquid separator 14 is guided to the intermediate-pressure port 11d of the compressor 11 via the intermediate-pressure refrigerant passage 15 and joins the refrigerant in the compression process.

As described above, in the first heating mode, it is possible to configure a gas injection cycle (i.e., two-stage compression refrigeration cycle) in which the low-pressure refrigerant reduced in pressure in the fixed throttle 17 is drawn into the compressor 11 and the intermediate-pressure refrigerant reduced in pressure in the first pressure reducer 13 joins the refrigerant in the compression process in the compressor 11. Therefore, in the present embodiment, the first heating mode is the two-stage compression mode.

In the first heating mode, the refrigerant does not flow through the interior evaporator 22 and therefore the interior blown air is not cooled in the interior evaporator 22. The interior blown air passing through the interior evaporator 22 exchanges heat with the high-pressure refrigerant thereby being heated in the interior condenser 12 and is blown into the vehicle compartment.

(B2) Second Heating Mode

In the second heating mode, the air conditioning ECU 40 brings the first pressure reducer 13 into the throttling state and the third pressure reducer 20 into the fully open state. The air conditioning ECU 40 opens the switching valve 173 and brings the second pressure reducer 17 into the fully open state. Furthermore, the air conditioning ECU 40 closes the intermediate-pressure switching valve 16 and opens the outlet of the three-way valve 21 connected to the second bypass passage 24.

As in the first heating mode, the air conditioning ECU 40 determines the operating states of the various devices, based on the target blowing temperature TAO and the like and outputs the control signals so as to achieve the determined operating states.

As a result, the heat pump cycle 10 is switched to the refrigerant circuit for the second heating mode in which the refrigerant flows as shown by thick lines and arrows in FIG. 3. In other words, the high-pressure refrigerant discharged from the discharge port 11c of the compressor 11 is condensed in the interior condenser 12 and the condensed high-pressure refrigerant is reduced in pressure in the first pressure reducer 13 until the refrigerant becomes the low-pressure refrigerant. The low-pressure refrigerant flowing out of the first pressure reducer 13 flows into the gas-liquid separator 14. At this time, because the intermediate-pressure switching valve 16 is in the closed state, the low-pressure refrigerant flowing into the gas-liquid separator 14 does not flow into the intermediate-pressure refrigerant passage 15 but flows into the exterior heat exchanger 18. The refrigerant flowing into the exterior heat exchanger 18 exchanges heat with the outside air thereby evaporating and is drawn into the suction port 11b of the compressor 11 via the accumulator 23.

In the second heating mode again, the refrigerant does not flow through the interior evaporator 22 and therefore the interior blown air is not cooled in the interior evaporator 22. The interior blown air passing through the interior evaporator 22 exchanges heat with the high-pressure refrigerant thereby being heated in the interior condenser 12 and is blown into the vehicle compartment.

Next, the temporary stop control of the compressor 11 at step S13 in FIG. 7 will be described. The temporary stop control of the compressor 11 is a control for stopping the compressor 11 during operation of the compressor 11 in the normal operation control and then restarting the compressor 11.

As shown in FIG. 8, the air conditioning ECU 40 determines whether the present operation mode is the two-stage compression mode at step S21. The two-stage compression mode is the above-described first heating mode. When the present operation mode is the first heating mode, the air conditioning ECU 40 makes a YES determination and proceeds to step S22.

At step S22, the air conditioning ECU 40 determines whether the electric power is available. The air conditioning ECU 40 determines whether the electric power is available based on a command from the host ECU 50. For example, the stop request signal, which requests to stop the compressor 11, includes a non-enabling signal that does not give the compressor 11 a permission to use the electric power and an enabling signal that gives the compressor 11 a permission to use a smaller amount of the electric power smaller than that in the normal operation control. When the stop request signal is output, the air conditioning ECU determines that the electric power is available. When the air conditioning ECU determines that the electric power is available (S22: YES), the flow advances to step S23.

At step S23, a deceleration control to reduce the rotational speed of the electric motor 112 is performed. The deceleration control is an operation control in which an operation of the electric motor 112 is controlled such that the rotational speed of the electric motor 112 is reduced by controlling the AC current to be output to the electric motor 112. Therefore, during the deceleration control, the AC current, a current value of which is larger than zero and electric power of which is acceptable amount, is output to the electric motor 112. In the deceleration control, an effective value of the AC current output to the electric motor 112 is gradually reduced so as to bring the electric motor 112 from the normal operating state to a state of being stopped. In the deceleration control, a rotational position of the rotor 112a is estimated by a first estimation method. At this time, a deceleration rate of the electric motor 112 is preferably large as possible not to be used in the normal operation control. The deceleration rate may be fixed or variable. Here, the electric motor 112 possibly comes out of control when the electric motor 112 is decelerated with the large deceleration rate. Then, a configuration of the electric motor 112 is preferably designed to have enough strength against shock that is caused when the electric motor 112 is stopped impulsively. The flow advances to step S24 after the air conditioning ECU 40 performs the deceleration control for a specified time period.

At step S24, the air conditioning ECU 40 performs a rotational direction reversing control of the electric motor 112. The rotational direction reversing control is an operation control of the electric motor 112 in which the AC current output to the electric motor 112 is controlled to rotate the electric motor 112 in a reversed rotational direction. In the operation control, a rotational position of the rotor is estimated by a second estimation method. At this time, a rotational speed is set to be constant or to be reduced to approach zero. The rotational speed is preferably set to a rotational speed such that an induced voltage, which is generated when the electric motor 112 rotates in the reversed rotational direction, becomes a specified voltage or lower. For example, the specified voltage is 60V. As a result, an increase of an input voltage, which causes due to the induced voltage generated when the electric motor 112 rotates in the reversed direction, can be suppressed. In the operation control of the electric motor 112 performed at step S24, a rotational position of the rotor is detected by a disturbance applying method since the rotational speed of the electric motor 112 is low.

The flow advances to step S25 after the above-described operation control at S24 is performed for a specified time period. The specified time period is set such that a pressure difference, which will be described later, between a pressure of refrigerant in the intermediate-pressure port 11d and a pressure of refrigerant in the suction port 11b becomes zero or approaches to zero. The operation control may be completed when a detected motor current or a detected motor voltage becomes lower than a specified value.

At step S25, the air conditioning ECU 40 stops the electric motor 112. In other words, the air conditioning ECU 40 stops supplying electric power to the electric motor 112.

Subsequently, at step S26, the air conditioning ECU 40 determines whether it is possible to restart the compressor 11. For example, the air conditioning ECU 40 determines whether it is possible to restart the compressor 11 based on whether or not the stop request signal to stop the compressor 11 is being output from the host ECU 50. When it is determined that the stop request signal is not being output, the air conditioning ECU 40 determines that the compressor 11 can be restarted (S26: YES), whereby the flow advances to step S27. On the other hand, when it is determined that the stop request signal is being output, the air conditioning ECU 40 determines that the compressor 11 cannot be restarted (S26: NO), whereby the flow repeats the operation of step S26. The air conditioning ECU 40 repeatedly performs the operation of step S26 until the determination at step S26 becomes YES.

At step S27, the air conditioning ECU 40 restarts the compressor 11. At this time, the air conditioning ECU 40 detects a position of the rotor by the disturbance applying method to perform the operation control of the electric motor 112.

When the air conditioning ECU 40 determines that the present operation mode is not the first heating mode at step S21 (S21: NO), the flow advances to step S28 and the compressor 11 is stopped. At this time, the compressor 11 is stopped by stopping supplying electric power to the electric motor 112, not by performing the operation controls of step S23 and S24.

When the air conditioning ECU 40 determines that the electric power is not available (S22: NO), the flow advances to step S28 and the compressor 11 is stopped.

After step S28, the air conditioning ECU 40 determines whether the restart is possible at step S29 as at step S26. When the air conditioning ECU 40 determines that the compressor 11 is ready to be restarted (S29: YES), the flow advances to step S27 and the compressor 11 is restarted. On the other hand, when the air conditioning ECU 40 determines that the compressor is not ready to be restarted (S29: NO), the air conditioning ECU 40 repeatedly performs the operation of step S29 until the air conditioning ECU 40 determines that the compressor 11 is ready to be restarted.

Thus, the air conditioning ECU 40 performs the above-described normal operation control after performing the temporary stop control of the compressor 11.

According to the present embodiment, step S22 corresponds to a determination section that determines whether the electric power is available for the electric compressor 11. Step S23 corresponds to a deceleration section that reduces the rotational speed of the electric motor 112. Step S24 corresponds to a rotational direction reversing section that rotates the electric motor 112 in the reversed rotational direction that is opposite from a rotational direction of the electric motor 112 in the two-stage compression mode. Step S25 corresponds to an operation stop section that stops the electric motor 112. Step S27 corresponds to a restart section that restarts the compressor 11 after the operation stop section stops the electric motor 112.

Here, characteristics of the present embodiment will be described while contrasted with a first comparative example. In the first comparative example, step S25 is performed without performing of steps S23 and S24 in the temporary stop control shown in FIG. 8. In other words, in the first comparative example, the compressor 11 is stopped by stopping supplying electric power to an electric motor 112 when the operation stop request to stop the compressor 11 is made in a first heating mode.

Figure 9:
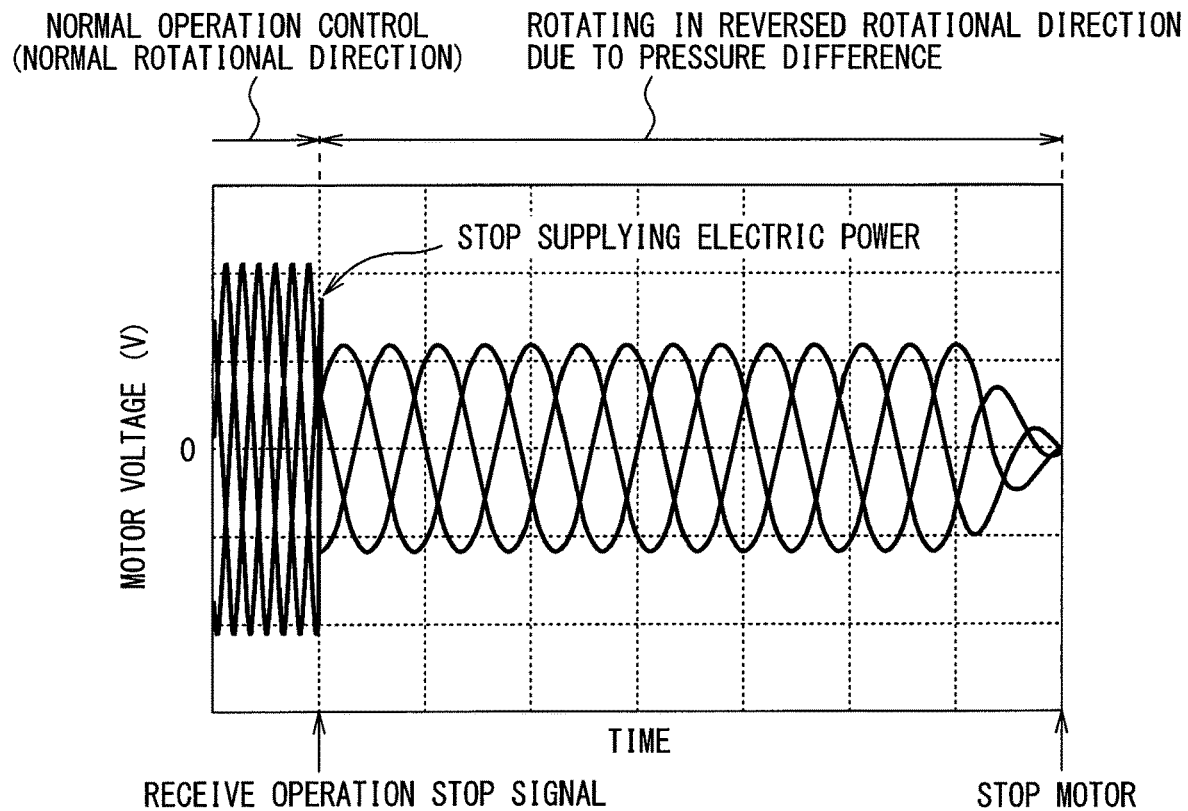
FIG. 9 is a diagram illustrating waveforms of motor voltages (i.e., U, V, and W phases) of an electric motor in a first comparative example.

As shown in FIG. 9, in the first comparative example, the air conditioning ECU 40 stops supplying electric power to the electric motor 112 when receiving the stop request signal. Accordingly, the refrigerant flows backward due to a pressure difference between a pressure of refrigerant in the intermediate-pressure port 11d and a pressure of refrigerant in the suction port 11b. As a result, the compressor 11 is kept rotating in the reversed rotational direction for a long time. The compressor 11 cannot be restarted while rotating in the reversed rotational direction. That is, the compressor 11 can be restarted after the compressor 11 stops rotating in the reversed rotational direction. As a result, the compressor 11 can be restarted promptly when the operation stop request, which requests to stop the compressor 11, is canceled. Thus, a temperature of the air, which is blown into the vehicle compartment, falls drastically and a comfortable feeling of a passenger may deteriorate.

Here, Patent Literature 1 discloses that a clutch is engaged such that a compressor, which uses driving force generated by the engine, is restarted even while the compressor rotates in the reversed rotational direction. In contrast, an electric compressor cannot be restarted while rotating in the reversed rotational direction due to the following reasons.

To start the electric motor for the electric compressor, it is necessary to start the electric motor after checking a position of an electrical angle of the rotor. Therefore, detection of the position of the electrical angle of the rotor is necessary. However, the electric motor is provided inside the compressor and the refrigerant flows in the compressor and therefore it is impossible to dispose a sensor that detects the position of the electrical angle of the rotor. Therefore, the position of the electrical angle of the rotor is normally estimated based on relationships among a voltage applied to the electric motor, a current flowing through the electric motor, and the electrical angle of the rotor when the rotor stops. When the compressor is rotating reversely in the detection of the position of the electrical angle of the rotor, a detected position of the electrical angle of the rotor and a position of the electrical angle at the time of starting are displaced from each other. In this case, the compressor fails to be started. As a result, it is impossible to start the electric compressor during the reverse rotation. When the detected position of the electrical angle of the rotor and the position of the electrical angle at the time of starting are not displaced from each other, it is possible to start the electric compressor.

According to the present embodiment, as described above, the air conditioning ECU 40 performs the deceleration control to reduce the rotational speed of the electric motor 112 at step S23 when the host ECU outputs the operation stop signal to stop the compressor 11 in the first heating mode. Subsequently, the air conditioning ECU 40 performs the rotational direction reversing control to rotate the electric motor 112 in the reversed rotational direction at step S24, and then stops the electric motor 112 at S25. Finally, the air conditioning ECU 40 restarts the compressor 11 at step S27 when the operation stop request, which is output by the host ECU 50 to stop the compressor 11, is canceled.

Figure 10:
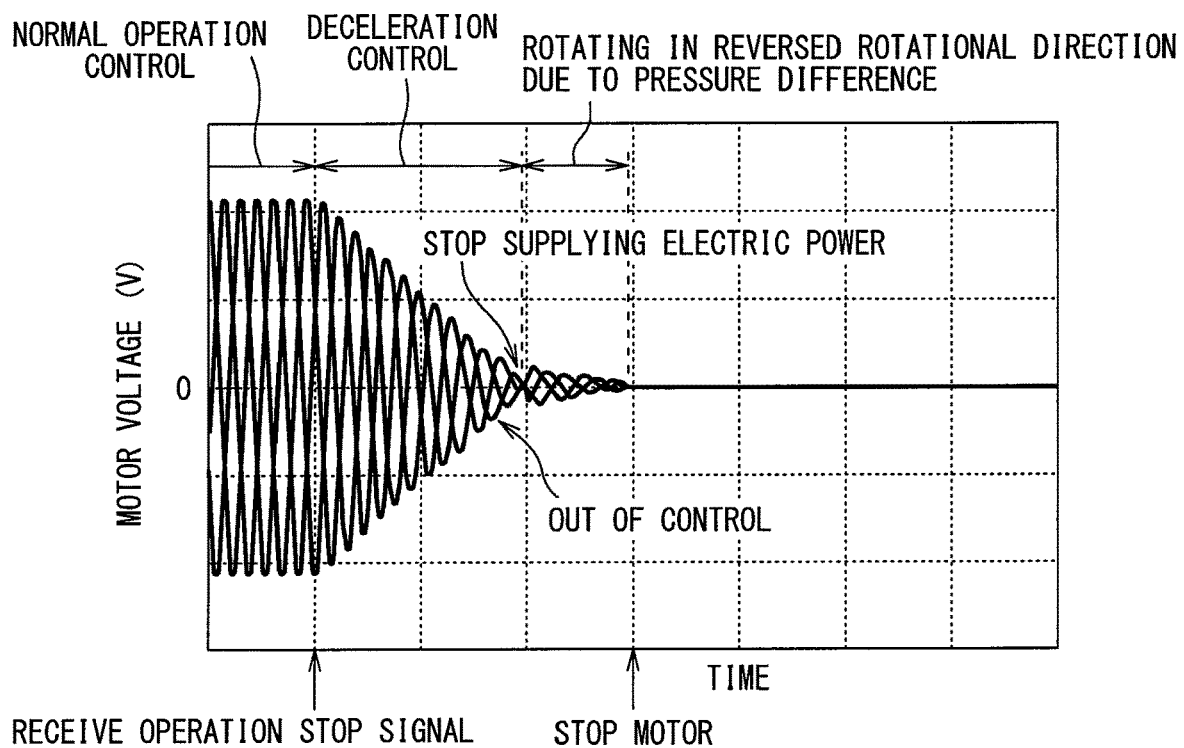
FIG. 10 is a diagram illustrating waveforms of motor voltages (i.e., U, V, and W phases) of the electric motor when a deceleration control at step S23 in the first embodiment is performed.

According to the present embodiment, the air conditioning ECU 40 reduces the rotational speed of the electric motor 112 before stopping the electric motor 112, i.e., before stopping supplying electric power. As a result, the pressure difference between a pressure of the refrigerant on a side adjacent to the intermediate-pressure port 11d and a pressure of the refrigerant on a side adjacent to the suction port 11b can be small as compared to the first comparative example in which the supply of electric power to the electric motor 112 is stopped without reducing the rotational speed of the electric motor 112. Therefore, as shown in FIG. 10, a time period, which is required to reverse the rotational direction and is caused due to the pressure difference, can be shortened as compared to a first comparative example shown in FIG. 9. FIG. 10 illustrates waveforms of the motor voltages (i.e., the U, V, and W phases) of the electric motor 112 when the supply of the electric power is stopped after performing only the deceleration control out of the deceleration control and the rotational direction reversing control in the present embodiment.

Furthermore, the air conditioning ECU 40 rotates the electric motor 112 in the reversed rotational direction after reducing the rotational speed of the electric motor 112. In this way, it is possible to reduce the pressure difference between the refrigerant on the side adjacent to the intermediate-pressure port 11d and the refrigerant on the side adjacent to the suction port 11b. Therefore, the time period shown in FIG. 10, which is required to reverse the rotational direction and is caused due to the pressure difference, can be shortened.

Therefore, according to the present embodiment, a time period from a time where the operation stop request requesting to stop the compressor 11 to a time where the electric motor 112 is stopped can be shortened as compared to the first comparative example. As a result, the compressor 11 can be restarted promptly when the operation stop request, which requests to stop the compressor 11, is canceled. Therefore, it is possible to suppress a reduction in the temperature of the interior blown air blown into the vehicle compartment.

Although the rotational position of the rotor 112a is estimated in the rotational direction reversing control of the electric motor 112 at step S24 in the present embodiment, the rotational position of the rotor 112a may not be estimated at step S24. In this case, the electric motor 112 can be rotated in the reversed rotational direction in a manner that AC current, which has a frequency that rotates the electric motor 112 in the reversed rotational direction, is output to the stator coils 112b, 112c, 112d.

Second Embodiment

Figure 11:
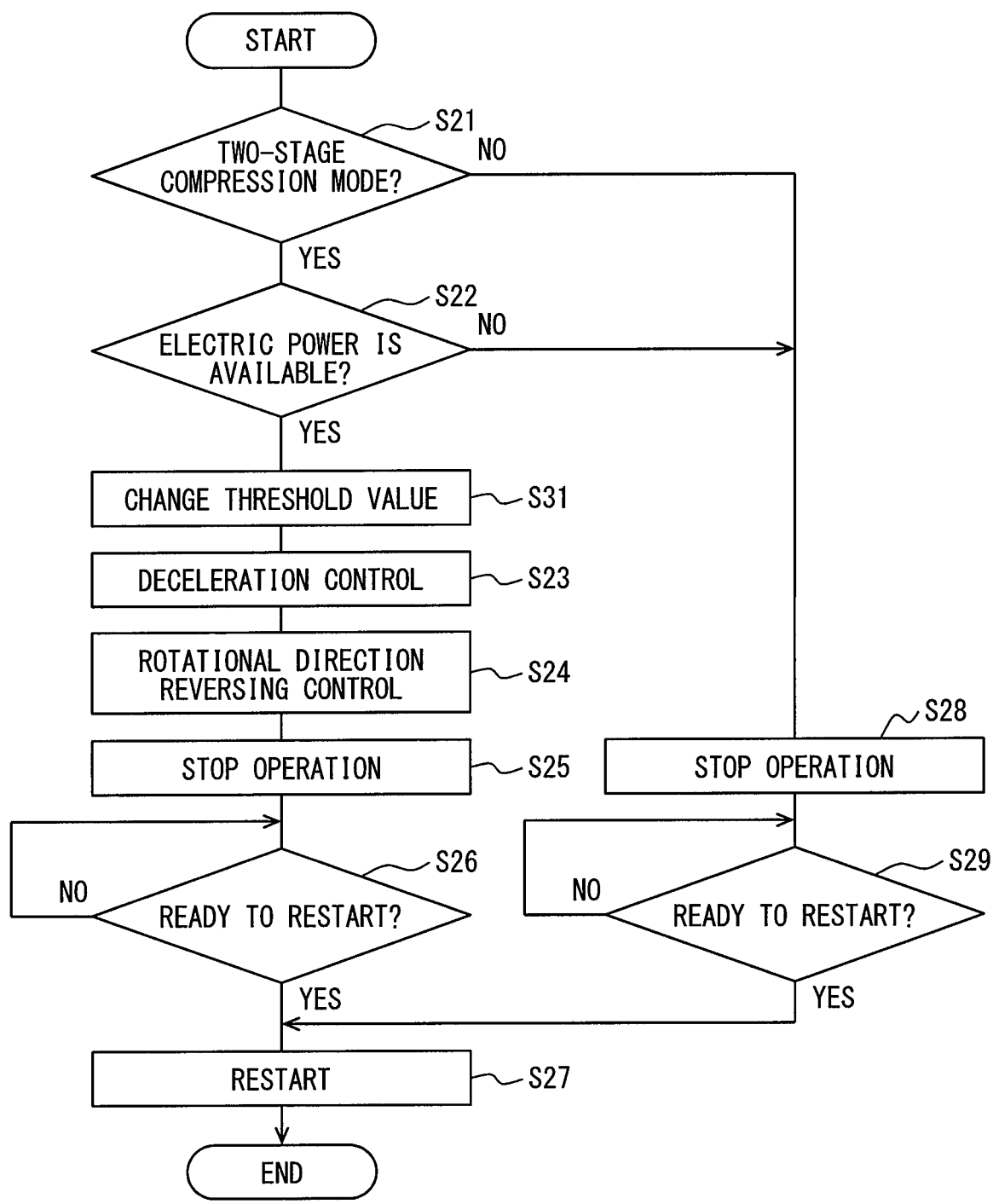
FIG. 11 is a flowchart of a temporary stop control performed by an air conditioning ECU in a second embodiment.

A temporary stop control of the compressor 11 performed at step S13 in FIG. 7 according to the present embodiment is different from that of the first embodiment. Specifically, the temporary stop control of the present embodiment performs step S31 as shown in FIG. 11 in addition to the flow chart shown in FIG. 8.

That is, when the air conditioning ECU 40 determines that electric power is available (S22: YES), the operation of step S31 is performed before the operation of step S23. At step S23, the air conditioning ECU 40 increases a threshold value that is used in an overcurrent stop control. Thus, step S23 corresponds to a threshold change section that changes a present threshold value to a threshold value higher than the present threshold value.

The overcurrent stop controls is a protection control that protects the electric motor 112. In the overcurrent stop control, supply of electric power to the electric motor 112 is stopped and thereby stopping the electric motor 112 when the motor current increases and becomes an overcurrent. Therefore, an increase of a temperature of the electric motor 112, which is caused when the motor current becomes the overcurrent, can be suppressed.

In a case where the air conditioning ECU 40 performs the operation of step S23 without performing the operation of step S31, a pressure of the intermediate-pressure refrigerant increases while the rotational speed of the electric motor 112 is reduced, whereby a load applied to the electric motor 112 increases. As a result, the motor current increases to the overcurrent, i.e., the motor current exceeds the threshold value, whereby the supply of electric power to the electric motor 112 is stopped. Since the supply of electric power to the electric motor 112 is stopped, it cannot suppress the abnormality that the compressor 11 rotates in the reversed rotational direction for a long time due to the pressure difference between the pressure of the refrigerant in the intermediate-pressure port 11d and the pressure of the refrigerant in the suction port 11b.

In the present embodiment, on the other hand, the air conditioning ECU 40 performs the deceleration control at step S23 after changing the threshold value for the overcurrent stop control to the higher threshold value. In this way, it is possible to widen an operating area without increasing the switching elements configuring the inverter 113 in rating or size to thereby avoid the stop of the supply of the electric power to the electric motor 112 due to the overcurrent during the deceleration control.

The threshold value after the change is determined by experiments, calculations, or the like in advance so as to be higher than the motor current value increased by the increase in pressure of the intermediate-pressure refrigerant. When the air conditioning ECU 40 receives the stop requesting signal, the compressor 11 is being driven. Therefore, an object to be cooled such as the inverter 113 is sufficiently cooled by the low-pressure refrigerant drawn into the compressor 11. Therefore, even if the motor current increases to be the overcurrent, the object to be cooled can be maintained in the cooled state and therefore it is possible to temporarily increase the threshold value.

Third Embodiment

Figure 12:
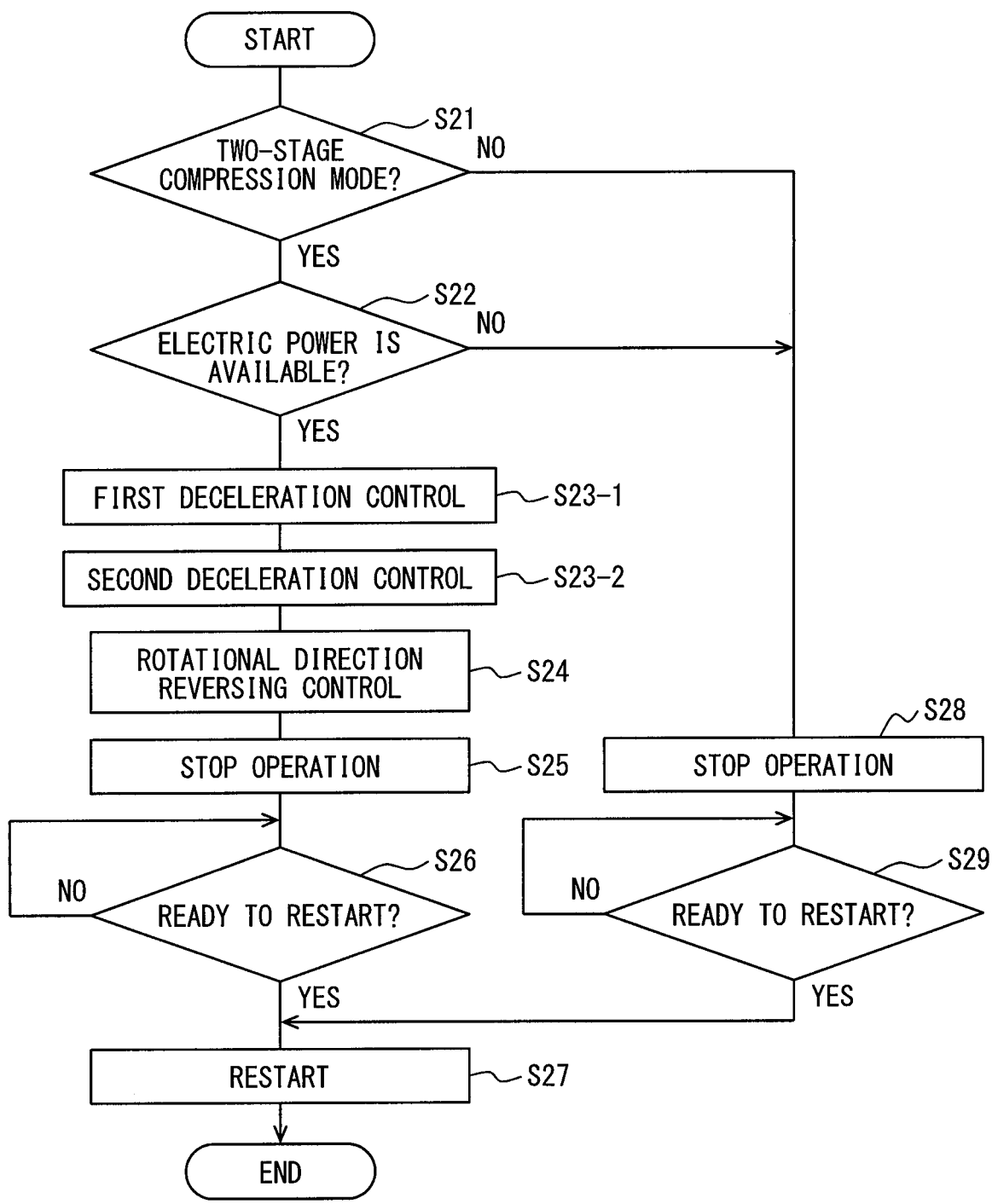
FIG. 12 is a flowchart of a temporary stop control performed by an air conditioning ECU in a third embodiment.

The present embodiment is configured by changing the temporary stop control of the compressor 11 at step S13 in FIG. 7 in the first embodiment. Specifically, in the present embodiment, step S23 in the flowchart in FIG. 8 is replaced by steps S23-1 and S23-2 as shown in FIG. 12.

When the air conditioning ECU 40 determines that the electric power is available (S22: YES), the air conditioning ECU 40 performs a first deceleration control for the electric motor 112 is reduced at step S23-1. The first deceleration control is, similar to step S23 shown in FIG. 8 according to the first embodiment, an operation control that reduces the rotational speed of the electric motor 112. In other words, in the first deceleration control, frequencies of AC currents applied to the stator coils 112b, 112c, 112d are controlled such that the rotational speed of the electric motor 112 is reduced.

The rotational position of the rotor 112a is estimated by a first estimation method. The first deceleration control is completed when the rotational speed of the electric motor 112 falls to a speed that is too slow to estimate the rotational position of the rotor 112a. For example, a specified time period from a time where the first deceleration control is started to a time where the rotational speed of the electric motor 112a falls to the speed that is too slow to estimate the rotational position of the rotor 112a is set in advance by experiments. In this case, the air conditioning ECU 40 stops performing the first deceleration control when the specified time period elapses from the time where the first deceleration control is started. Subsequently, the flow advances to step S23-2.

Figure 13:
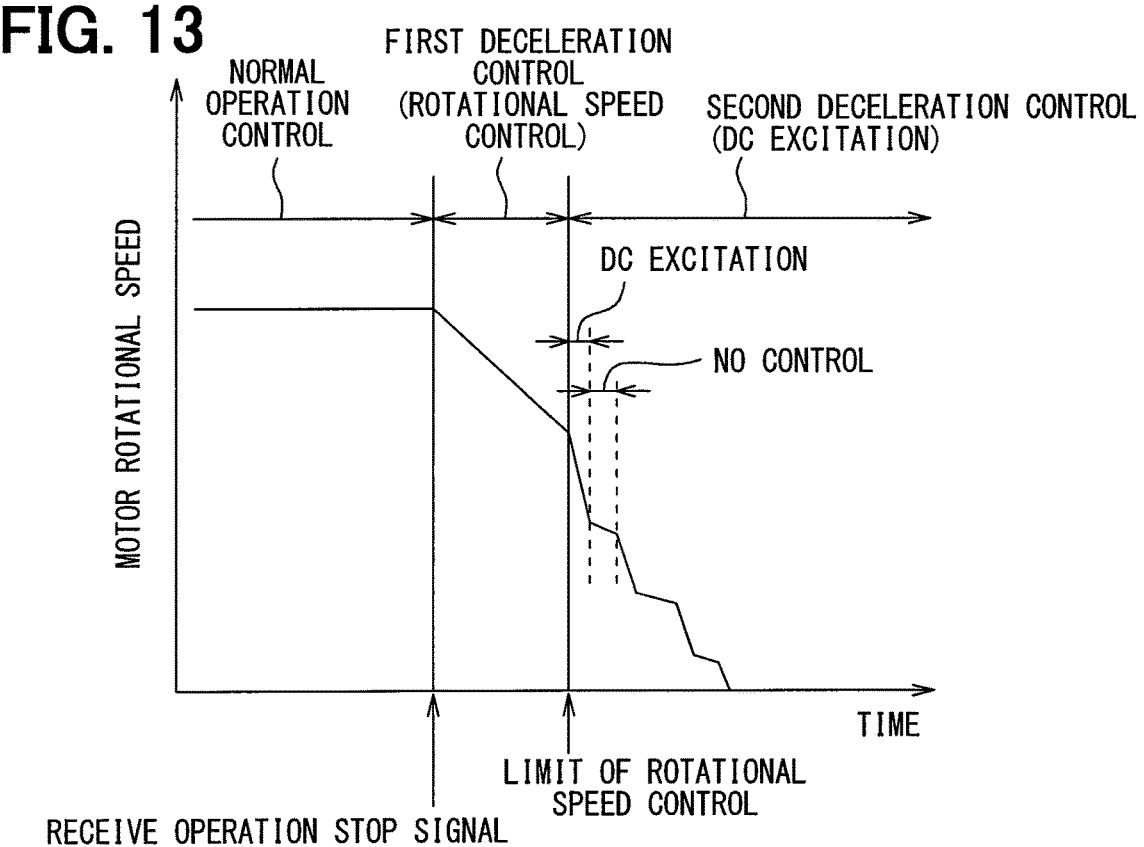
FIG. 13 is a diagram illustrating a relationship between a motor rotational speed and time in order to explain a second deceleration control in the third embodiment.

At step S23-2, the air conditioning ECU 40 performs a second deceleration control of the electric motor 112. The second deceleration control is a control for generating torque in a deceleration direction in the rotor 112a by DC excitation for supplying a DC current from an inverter 113 to any of the stator coils 112b, 112c, and 112d to excite the stator coil. At this time, as shown in FIG. 13, it is preferable to repeat no control for not supplying the DC current and the DC excitation. Instead of DC exciting the specific stator coil, it is preferable to switch the stator coil to be DC excited among the three-phase stator coils 112b, 112c, and 112d. In this way, as compared with continuously DC exciting only the specific stator coil, it is possible to suppress heat generation of the inverter element. When a direction of the DC current supplied to the stator coil 112b, 112c, or 112d is switched, a switching cycle is longer than a frequency of an AC current.

Figure 14:
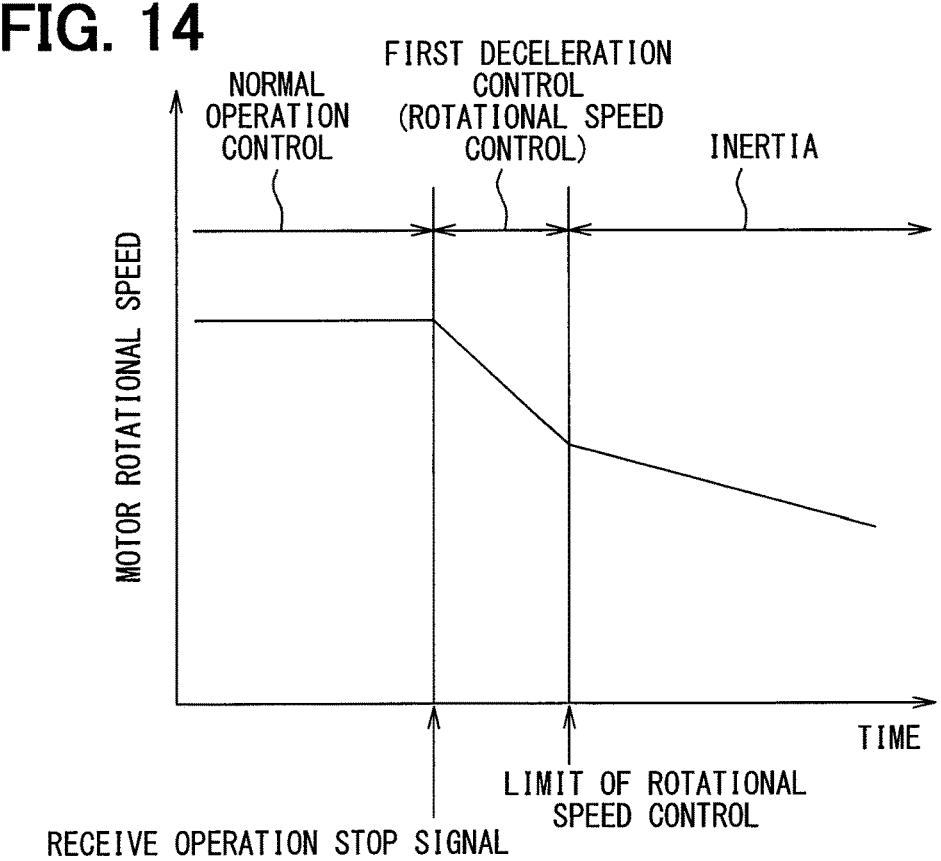
FIG. 14 is a diagram illustrating a relationship between a motor rotational speed and time in order to explain a operation control of an electric motor in a second comparative example.

Here, FIG. 14 illustrates a operation control of the electric motor 112 in a second comparative example. In the second comparative example, the air conditioning ECU 40 stops driving of the electric motor 112 (i.e., stops supply of electric power to the electric motor 112) without performing a second deceleration control after a first deceleration control. In this case, after the first deceleration control, the electric motor naturally reduces in speed.

In the present embodiment, the air conditioning ECU 40 performs the second deceleration control after the first deceleration control. In this way, as compared with the second comparative example, it is possible to reduce the speed of the electric motor 112 faster to thereby reduce a pressure difference between refrigerant at the intermediate-pressure port 11d and refrigerant at the suction port 11b. Thus, the time period from a time where the operation stop request requesting to stop the compressor 11 is made to a time where the electric motor 112 is stopped can be shortened. As a result, the compressor 11 can be restarted promptly when the operation stop request, which requests to stop the compressor 11, is canceled.

In the present embodiment, step S23-1 corresponds to a first deceleration section that reduces the rotational speed of the electric motor by controlling the AC currents output to the electric motor. Step S23-2 corresponds to a second deceleration section that reduces the rotational speed of the electric motor by supplying the DC current to the stator coil to excite the stator coil.

Fourth Embodiment

Figure 15:
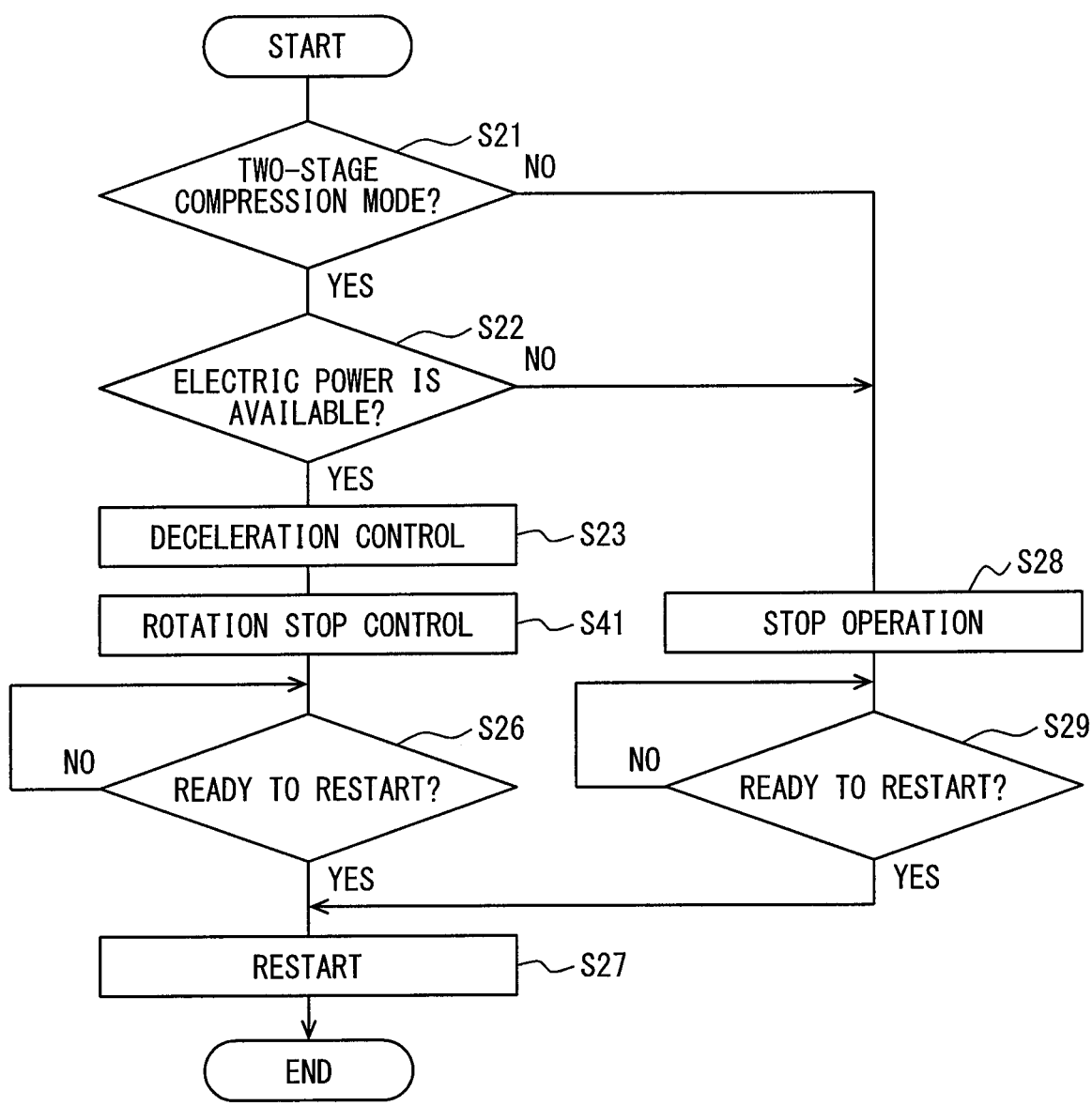
FIG. 15 is a flowchart of a temporary stop control performed by an air conditioning ECU in a fourth embodiment.

The present embodiment is configured by changing the temporary stop control of the compressor 11 at step S13 in FIG. 7 in the first embodiment. Specifically, in the present embodiment, steps S24 and S25 in the flowchart in FIG. 8 are replaced by step S41 as shown in FIG. 15.

The air conditioning ECU 40 performs a rotation stop control at step S41 after performing the deceleration control at step S23. In the rotation stop control, the air conditioning ECU 40 controls AC current output to the electric motor 112 such that the rotational speed of the electric motor 112 becomes zero. Therefore, step S41 corresponds to a rotation stop section that controls the rotational speed of the electric motor to be zero.

The rotation stop control is a control in which a torque is applied to the rotor 112a, which is about to rotate in the reversed rotational direction due to the pressure difference between the pressure of the refrigerant in the intermediate-pressure port 11d and the pressure of the refrigerant in the suction port 11b, to rotate in a normal rotational direction after the deceleration control of step S23 is completed. In the rotation stop control, a magnetic field is generated in the stator coils 112b, 112c, 112d to rotate the rotor 112a in the normal rotational direction. In addition, in the rotation stop control, the rotational position of the rotor 112 a is estimated by the turbulence applying method. The flow advances to step S26 after the specified time period elapses from the time where the air conditioning ECU 40 starts the operation of step S41. The rotation stop control of step S41 is continued until the compressor 11 is restarted at step S27. That is, the compressor 11 is stopped temporary before being restarted.

The air conditioning ECU 40, at step S26, determines whether the compressor 11 is ready to be restarted. When the air conditioning ECU 40 determines whether the compressor 11 is ready to be restarted (S26: YES), the flow advances to step S27, and the air conditioning ECU 40 restarts the compressor 11. The operations performed at step S26 and step S27 are the same as those described in the first embodiment. Therefore, according to the present embodiment, step S27 corresponds to a restart section that restarts the compressor after the rotation stop section set the rotational speed to zero.

In the present embodiment, the air conditioning ECU 40 performs the rotation stop control at step S41 after the deceleration control at step S23. In this way, it is possible to quickly restart the compressor 11 by estimating the position of the rotor 112a in the rotation stop control. In other words, it is possible to quickly return to a normal operation control.

According to the present embodiment, the operations of step S23 and step S24 are performed when the air conditioning ECU 40 determines that the operation stop request to stop the compressor 11 is made (S11: YES, FIG. 7) and determines that the electric power is available (S22: YES). At S22, it is determined that the electric power is available when the enabling signal, which permits the compressor 11 to use the electric power smaller than that in the normal operation control, is output from the host ECU 50 to the air conditioning ECU 40. Even when the host ECU 50 outputs the enabling signal to the air conditioning ECU 40, it does not mean that the host ECU 50 requests the air conditioning ECU 40 to stop supplying electric power to the compressor 11. It only means that the host ECU 50 requests the air conditioning ECU 40 to reduce electric power supplied to the compressor 11 to be smaller than a currently supplying amount.

Thus, according to the present embodiment, the air conditioning ECU 40 performs the deceleration control at step S23 and the rotation stop control at step S41 when the host ECU 50 requests the air conditioning ECU 40 to reduce the electric power supplied to the compressor 11. Therefore, step S23 of the present embodiment corresponds to a deceleration section that reduces the rotational speed of the electric motor when an electric power reducing request, which requests to reduce the electric power supplied to the electric compressor to be smaller than the currently supplying amount, is made. The deceleration control at step S23 and the rotation stop control at step S41 require smaller amount of electric power than the normal operation control.

Modifications

The present disclosure is not limited to the above-described embodiments and can be modified within the scope of the present disclosure as defined by the appended claims.

(1) Although the air conditioning ECU 40 determines whether the restart is possible at step S26 after stopping the driving of the electric motor 112 at step S25 in the first embodiment, the air conditioning ECU 40 may perform the determination before step S25, i.e., during the control at step S24 or the control at step S23, for example. In this case, if the YES determination is made at step S26, the air conditioning ECU 40 does not perform the restart until the driving of the electric motor 112 is stopped and performs the restart immediately after the driving of the electric motor 112 is stopped. The same holds true for the second and third embodiments.

(2) Although the air conditioning ECU 40 performs step S24 after step S23 in the first and second embodiments, the air conditioning ECU 40 may not perform step S24. The air conditioning ECU 40 may not perform step S24 after steps S23-1 and S23-2 in the third embodiment. In these cases, if the air conditioning ECU 40 performs the deceleration control at step S23 or the first and second deceleration controls at steps S23-1 and S23-2, it is possible to obtain similar effects to those of the first embodiment.

(3) The temporary stop control in the first to third embodiments may be performed for an emergency stop or an urgent stop of the compressor 11. In this case, the restart is unnecessary. In this case, by performing the rotational direction reversing control at step S24, it is possible to suppress increase in an input voltage caused by generation of induced voltages due to reverse rotation at the time of a vehicle collision to thereby comply with laws and regulations of the voltage at the time of the vehicle collision.

(4) Although the air conditioning ECU 40 performs the temporary stop control of the compressor 11 at step S13 in FIG. 7 when the temporary stop of the compressor 11 is necessary in the first heating mode in the first to fourth embodiments, the host ECU 50 may perform the temporary stop control of the compressor 11. In this case, the host ECU 50 is configured to be able to directly control the inverter 113 without involving the air conditioning ECU 40. Moreover, when the air conditioning ECU 40 and the host ECU 50 simultaneously perform the controls of the inverter 113, the control by the host ECU 50 has priority. In this case, the air conditioning ECU 40, the host ECU 50, and the inverter 113 correspond to an electric compressor controller.

(5) Although the intermediate-pressure switching valve 16 switches between flowing and prohibition of flowing of the intermediate-pressure refrigerant into the intermediate-pressure refrigerant passage 15 in each of the above-described embodiments, the invention is not limited to the embodiments. An integrated valve into which a function of an intermediate-pressure switching valve 16 and functions of other devices configuring the heat pump cycle 10 are integrated may switch between flowing and prohibition of flowing of intermediate-pressure refrigerant into an intermediate-pressure refrigerant passage 15. An example of the integrated valve is an integrated valve into which functions of the intermediate-pressure switching valve 16, the gas-liquid separator 14, the fixed throttle 171, and the switching valve 173 of the first bypass passage 172 are integrated.

(6) Although the air conditioning device 1 for the vehicle switches between and performs the first heating mode and the second heating mode in performing the heating mode in each of the above-described embodiments, the air conditioning device 1 may perform only the first heating mode. Alternatively, the air conditioning device 1 for the vehicle may perform only the heating mode out of the heating mode and the cooling mode.

(7) Although the air conditioning device for the vehicle in the present disclosure is applied to the hybrid vehicle in each of the above-described embodiments, the air conditioning device for the vehicle may be applied to other vehicles such as an electric car and a fuel cell vehicle, if the vehicle is mounted with an electric compressor.

(8) The above-described embodiments are not unrelated to each other and can be combined with each other except for a case where the combination is clearly improper. In the above-described embodiments, it is to be understood that elements constituting the embodiments are not necessary except for a case of being explicitly specified to be necessary and a case of being considered to be absolutely necessary in principle.

What is claimed is:

1. An electric compressor controller that controls an electric rotary-type compressor mounted to a vehicle and configured as a two-stage compression refrigeration cycle device, the electric compressor having an electric AC motor using an AC current, a suction port, a discharge port, and an intermediate-pressure port, the electric compressor operated by the electric motor to compress a refrigerant and configured to draw a low-pressure refrigerant from the suction port, to compress the low-pressure refrigerant to be a high-pressure refrigerant, to discharge the high-pressure refrigerant from the discharge port, and to draw an intermediate-pressure refrigerant from the intermediate pressure port to join the refrigerant being compressed, the intermediate-pressure refrigerant having an intermediate pressure between a pressure of the low pressure refrigerant and a pressure of the high pressure refrigerant, the electric compressor controller comprising:
at least one processor configured to
determine whether an operation stop request is made or canceled, the operation stop request being a request to stop the electric compressor,
determine whether a two-stage compression mode is performed, the two-stage compression mode being performed when the intermediate-pressure refrigerant flows into the electric compressor from the intermediate-pressure port,
reduce a rotational speed of the electric motor while electric power is supplied to the electric motor by controlling the AC current applied to the electric motor, in response to the two-stage compression mode being performed and the operation stop request being made,
stop the electric motor after reducing the rotational speed of the electric motor,
restart the electric compressor in response to the operation stop request being canceled after stopping the electric compressor, and increase a threshold value of the AC current applied to the electric motor, after the operation stop request is made and before reducing the rotation speed of the electric motor, wherein in response to the AC current applied to the electric motor exceeding the threshold value, the electric compressor is further configured to stop supplying the electric power to the electric motor.

2. The electric compressor controller according to claim 1, wherein the at least one processor is further configured to control the AC current applied to the electric motor so as to rotate the electric motor in a reversed rotational direction relative to a rotational direction of the electric motor in the two-stage compression mode, after reducing the rotational speed of the electric motor and before stopping the electric motor.

3. The electric compressor controller according to claim 1, wherein the electric motor has a stator coil, and the at least one processor is further configured to further reduce the rotational speed of the electric motor by applying a DC current to the stator coil to excite the stator coil after reducing the rotational speed of the electric motor by controlling the AC current and before stopping the electric motor.

4. The electric compressor controller according to claim 1, wherein the at least one processor is further configured to determine whether the electric power is available for the electric compressor, and reduce the rotational speed of the electric motor in response to determining that the electric power is available.

5. An electric compressor controller that controls an electric rotary-type compressor mounted to a vehicle and configured as a two-stage compression refrigeration cycle device, the electric compressor having an electric AC motor using an AC current, a suction port, a discharge port, and an intermediate-pressure port, the compressor operated by the electric motor to compress a refrigerant and configured to draw a low-pressure refrigerant from the suction port, to compress the low-pressure refrigerant to be a high-pressure refrigerant, to discharge the high-pressure refrigerant from the discharge port, and to draw an intermediate-pressure refrigerant from the intermediate pressure port to join the refrigerant being compressed, the intermediate-pressure refrigerant having an intermediate pressure between a pressure of the low pressure refrigerant and a pressure of the high pressure refrigerant, the electric compressor controller comprising:

at least one processor configured to determine whether an electric power decreasing request is made or canceled, the electric power decreasing request being a request to decrease electric power supplied to the electric compressor, determine whether a two-stage compression mode is performed, the two-stage compression mode being performed when the intermediate-pressure refrigerant flows into the electric compressor from the intermediate-pressure port, reduce a rotational speed of the electric motor while the electric power is supplied to the electric motor by controlling the AC current applied to the electric motor, in response to the two-stage compression mode being performed and the electric power decreasing request being made, control the rotational speed of the electric motor to be zero by controlling the AC current applied to the electric motor after reducing the rotational speed of the electric motor, restart the electric compressor in response to the electric power decreasing request being canceled after controlling the rotational speed to be zero, and increase a threshold value of the AC current applied to the electric motor, after the electric power decreasing request is made and before reducing the rotational speed of the electric motor, wherein in response to the AC current applied to the electric motor exceeding the threshold value, the electric compressor is further configured to stop supplying the electric power to the electric motor.

6. A two-stage compression refrigeration cycle device for a vehicle, the refrigeration cycle device comprising:

an electric rotary-type compressor having an AC electric motor using an AC current, a suction port, a discharge port, and an intermediate-pressure port, the electric compressor operated by the electric motor to compress a refrigerant and configured to draw a low-pressure refrigerant from the suction port, compress the low-pressure refrigerant to be a high-pressure refrigerant, discharge the high-pressure refrigerant from the discharge port, and draw an intermediate-pressure refrigerant from the intermediate pressure port to join the refrigerant being compressed, the intermediate pressure refrigerant having an intermediate pressure between a pressure of the low pressure refrigerant and a pressure of the high pressure refrigerant;

a radiator that dissipates heat of the high-pressure refrigerant discharged from the discharge port by performing a heat exchange between the high-pressure refrigerant and air to be blown into a vehicle compartment;

a first pressure reducer that decompresses a refrigerant from the radiator to be the intermediate-pressure refrigerant;

a gas-liquid separator that separates the intermediate-pressure refrigerant from the first pressure reducer into a gas-phase refrigerant and a liquid-phase refrigerant;

a second pressure reducer that decompresses the liquid-phase refrigerant separated in the gas-liquid separator to be the low-pressure refrigerant;

an exterior heat exchanger that is configured to evaporate a refrigerant from the second pressure reducer by performing a heat exchange between the refrigerant from the second pressure reducer and an outside air from outside of the vehicle compartment, and to guide the refrigerant from the second pressure reducer to flow to the suction port;

an intermediate-pressure refrigerant passage that guides the gas-phase refrigerant separated in the gas-liquid separator to the intermediate-pressure port; and a controller having at least one processor for controlling the electric compressor, the controller configured to determine whether an operation stop request is made or canceled, the operation stop request being a request to stop the electric compressor, determine whether a two-stage compression mode is performed, the two-stage compression mode being performed when the intermediate-pressure refrigerant flows into the electric compressor from the intermediate-pressure port, determine whether electric power is available for the electric compressor, reduce a rotational speed of the electric motor while the electric power is supplied to the electric motor by controlling the AC current applied to the electric motor, in response to the two-stage compression mode being performed, the operation stop request being made, and upon determining that the electric power is available, stop the electric motor after reducing the rotational speed of the electric motor, and restart the electric compressor after stopping the electric compressor in response to the operation stop request being canceled.

7. A two-stage compression refrigeration cycle device for a vehicle, the refrigeration cycle device comprising:

an electric rotary-type compressor having an AC electric motor using an AC current, a suction port, a discharge port, and an intermediate-pressure port, the electric compressor operated by the electric motor to compress a refrigerant and configured to draw a low-pressure refrigerant from the suction port, compress the low-pressure refrigerant to be a high-pressure refrigerant, discharge the high-pressure refrigerant from the discharge port, and draw an intermediate-pressure refrigerant from the intermediate pressure port to join the refrigerant being compressed, the intermediate-pressure refrigerant having an intermediate pressure between a pressure of the low pressure refrigerant and a pressure of the high pressure refrigerant;

a radiator that dissipates heat of the high-pressure refrigerant discharged from the discharge port by performing a heat exchange between the high-pressure refrigerant and air to be blown into a vehicle compartment;

a first pressure reducer that decompresses a refrigerant from the radiator to be the intermediate-pressure refrigerant;

a gas-liquid separator that separates the intermediate-pressure refrigerant from the first pressure reducer into a gas-phase refrigerant and a liquid-phase refrigerant;

a second pressure reducer that decompresses the liquid-phase refrigerant separated in the gas-liquid separator to be the low-pressure refrigerant;

an exterior heat exchanger that is configured to evaporate a refrigerant from the second pressure reducer by performing a heat exchange between the refrigerant from the second pressure reducer and an outside air from outside of the vehicle compartment, and to guide the refrigerant from the second pressure reducer to flow to the suction port;

an intermediate-pressure refrigerant passage that guides the gas-phase refrigerant separated in the gas-liquid separator to the intermediate-pressure port; and a controller having at least one processor for controlling the electric compressor, the controller configured to determine whether an electric power decreasing request is made or canceled, the electric power decreasing request being a request to decrease electric power supplied to the electric compressor, determine whether a two-stage compression mode is performed, the two-stage compression mode being performed when the intermediate-pressure refrigerant flows into the electric compressor from the intermediate-pressure port, reduce a rotational speed of the electric motor while the electric power is supplied to the electric motor by controlling the AC current applied to the electric motor, in response to the two-stage compression mode being performed and the electric power decreasing request being made, control the rotational speed of the electric motor to be zero by controlling the AC current applied to the electric motor after reducing the rotational speed of the electric motor, restart the electric compressor in response to the electric power decreasing request being canceled after controlling the rotational speed to be zero, and increase a threshold value of the AC current applied to the electric motor, after the electric power decreasing request is made and before reducing the rotational speed of the electric motor, wherein in response to the AC current applied to the electric motor exceeding the threshold value, the electric compressor is further configured to stop supplying the electric power to the electric motor.

8. An electric compressor controller that controls an electric rotary-type compressor mounted to a vehicle and configured as a two-stage compression refrigeration cycle device, the electric compressor having a suction port, a discharge port, an intermediate-pressure port, and an electric AC motor using an AC current, the electric motor having a stator coil, the electric compressor operated by the electric motor to compress a refrigerant and configured to draw a low-pressure refrigerant from the suction port, compress the low-pressure refrigerant to be a high-pressure refrigerant, discharge the high-pressure refrigerant from the discharge port, and draw an intermediate-pressure refrigerant from the intermediate pressure port to join the refrigerant being compressed, the intermediate-pressure refrigerant having an intermediate pressure between a pressure of the low pressure refrigerant and a pressure of the high pressure refrigerant, the electric compressor controller comprising:

at least one processor configured to determine whether an operation stop request is made or canceled, the operation stop request being a request to stop the electric compressor, determine whether a two-stage compression mode is performed, the two-stage compression mode being performed when the intermediate-pressure refrigerant flows into the electric compressor from the intermediate-pressure port, reduce a rotational speed of the electric motor while electric power is supplied to the electric motor by controlling the AC current applied to the electric motor, in response to the two-stage compression mode being performed and the operation stop request being made, reduce the rotational speed of the electric motor by applying a DC current to the stator coil to excite the stator coil after reducing the rotational speed of the electric motor by controlling the AC current and before stopping the electric motor, stop the electric motor after reducing the rotational speed of the electric motor, and restart the electric compressor in response to the operation stop request being canceled after stopping the electric compressor.

9. An electric compressor controller that controls an electric rotary-type compressor mounted to a vehicle and configured as a two-stage compression refrigeration cycle device, the electric compressor having an electric AC motor using an AC current, a suction port, a discharge port, and an intermediate-pressure port, the electric compressor operated by the electric motor to compress a refrigerant and configured to draw a low-pressure refrigerant from the suction port, compress the low-pressure refrigerant to be a high-pressure refrigerant, discharge the high-pressure refrigerant from the discharge port, and draw an intermediate-pressure refrigerant from the intermediate pressure port to join the refrigerant being compressed, the intermediate-pressure refrigerant having an intermediate pressure between a pressure of the low pressure refrigerant and a pressure of the high pressure refrigerant, the electric compressor controller comprising:

at least one processor configured to determine whether an operation stop request is made or canceled, the operation stop request being a request to stop the electric compressor, determine whether a two-stage compression mode is performed, the two-stage compression mode being performed when the intermediate-pressure refrigerant flows into the electric compressor from the intermediate-pressure port, determine whether electric power is available for the electric compressor, reduce a rotational speed of the electric motor while the electric power is supplied to the electric motor by controlling the AC current applied to the electric motor, in response to the two-stage compression mode being performed, the operation stop request being made, and upon determining the electric power is available, stop the electric motor after reducing the rotational speed of the electric motor, and restart the electric compressor in response to the operation stop request being canceled after stopping the electric compressor.

\* \* \* \* \*